United States Patent
Wilson et al.

[15] 3,660,722

[45] May 2, 1972

[54] CIRCUIT BREAKER INCLUDING IMPROVED GROUND FAULT PROTECTIVE DEVICE

[72] Inventors: John T. Wilson, Beaver; Joseph C. Engel, Monroeville, both of Pa.

[73] Assignee: Westinghouse Electric Corporation, Pittsburgh, Pa.

[22] Filed: May 7, 1970

[21] Appl. No.: 35,516

[52] U.S. Cl. ........................... 317/18 R, 317/33 SC, 317/38, 317/141 S
[51] Int. Cl. ......................................................... H01h 47/18
[58] Field of Search ............. 317/33 SC, 36 TD, 18 R, 141 S, 317/38

[56] References Cited

UNITED STATES PATENTS 3,440,491  4/1969  Tenenbaum et al. ............... 317/36 TD
3,543,094  11/1970  South et al. ......................... 317/36 TD Primary Examiner—James D. Trammell
Attorney—A. T. Stratton and C. L. McHale

[57] ABSTRACT

A circuit breaker including separable contacts, an operating means for opening and closing the contacts, and a protective relay device for detecting ground faults in an alternating current system when the ground current in the system being protected increases above a predetermined level which for certain values of line currents in the protected system varies with the line currents in the associated system. A current transformer is arranged to provide the energy or power necessary for the output of the device and also to provide a first signal which varies with the ground current in the system and other means is provided for deriving a second signal from the associated system which varies with the line current in the system for with the highest line current in the system with said protective device arranged to respond to both of said signals.

12 Claims, 3 Drawing Figures

Patented May 2, 1972

CIRCUIT BREAKER INCLUDING IMPROVED GROUND FAULT PROTECTIVE DEVICE

CROSS-REFERENCES TO RELATED APPLICATIONS

Certain inventions either disclosed in the present application or related to those disclosed in the present application are disclosed and claimed in copending applications Ser. No. 765,584, filed Oct. 7, 1968 by J. D. Watson, F. T. Thompson and F. O. Johnson, Ser. No. 765,582, filed Oct. 7, 1968, by J. D. Watson, Ser. No. 765,583, filed Oct. 7, 1968 by J. D. Watson, Ser. No. 765,552, filed Oct. 7, 1968 by W. H. South and J. H. Taylor (which issued Nov. 24, 1970 as U.S. Pat. No. 3,543,094), Ser. No. 35,531, filed concurrently by J. C. Engel and R. T. Elms (which issued Aug. 31, 1971 as U.S. Pat. No. 3,602,783), Ser. No. 35,517, filed concurrently by J. C. Engel and R. T. Elms, Ser. No. 35,409, filed concurrently by J. T. Wilson, and Ser. No. 35,382, filed concurrently by A. J. Hendry and J. T. Wilson which are all assigned to the same assignee as the present application.

BACKGROUND OF THE INVENTION

This invention relates to circuit breakers including protective relay devices and more particularly to circuit breakers including ground fault protective devices.

In copending application Ser. No. 765,583 previously mentioned, an improved ground fault protective circuit or device is disclosed in which a current transformer is connected to an associated means which supplies an output current which varies with the ground current in an associated alternating current system. The alternating current output of the current transformer is applied to a rectifying means to obtain a unidirectional output current which varies with the ground current in the system being protected. A resistor and an energy storing capacitor are connected in series with one another across the output of the rectifying means to develop a unidirectional signal across the resistor which varies with the ground current in the protected system and the same current which flows through the resistor also charges the capacitor to provide the necessary energy or power required for the operation of the protective device. A level detecting circuit is connected across the resistor to respond to the unidirectional current signal across the resistor and to produce an output when the unidirectional current signal exceeds a predetermined signal level.

It has been found that in the operation of the above ground fault protective device or circuit, certain problems arise when the line currents in the associated alternating current system being protected increase to certain levels or values due to variations in the current transformers employed to obtain the ground current signal or due to interactions between the current transformers employed with the different phases or line conductors of the alternating current system. Such problems may result in undesirable tripping operations of the circuit breaker which is responsive to the ground fault protective device.

SUMMARY OF THE INVENTION

In accordance with the invention, a circuit breaker including separable contacts, an operating means for opening and closing the contacts, and a ground fault protective device is provided in which a current transformer is connected to means for providing an output current which varies with the ground current in the associated alternating current system. The current transformer provides an alternating output current which varies with the ground current in the protected system and which provides both the energy or power required for the operation of the protective device and the current to develop a ground current signal to which the protective relay device responds. The alternating current output of the current transformer is applied to a rectifying means to obtain a first unidirectional output current or signal which varies with the ground current in the system being protected. The ground fault protective device also includes first means for deriving a second unidirectional current output signal which varies with the line current in the associated alternating current system or with the highest line current in the alternating current system.

A level detecting circuit is connected to the rectifying means and to the first means to respond to both said first and said second unidirectional current output signals. As long as the second unidirectional current output signal remains below or less than a first predetermined value, the level detecting circuit produces an output when the first unidirectional output current signal exceeds a second predetermined value or level. An additional circuit means is connected between the above-mentioned first means and the level detecting circuit for modifying the value of the first output signal to which the level detecting circuit responds to produce the above-mentioned output to thereby vary said value of the first output signal with the second output signal when the second output signal exceeds the above-mentioned first predetermined value which corresponds to a predetermined level of line current in the associated alternating current system or to a predetermined level of the highest line current in said alternating current system. Where desired, a time delay circuit may be provided and connected to the level detecting circuit to produce a time delayed output following a time delay which is initiated when the level detecting circuit produces the above-mentioned output either when the first unidirectional output current signal exceeds the above-mentioned second predetermined value and the second unidirectional output current signal is below the above-mentioned first predetermined value or when the first unidirectional output current signal exceeds a value which varies with the second unidirectional output current after the second unidirectional output current has exceeded the above-mentioned first predetermined value.

In a more specific aspect of the invention, a resistor and at least one energy storing capacitor may be connected in series with one another across the output of the rectifying means to develop the first unidirectional output current signal mentioned above across the resistor which varies with the ground current in the protected system and the same current which flows through the resistor may also charge an energy storing capacitor to provide the necessary energy or power required for the operation of the overall protective device. A semiconductive means such as a Zener diode or a shunt voltage regulator may also be connected across the energy storing capacitor to limit the maximum voltage across said capacitor.

BRIEF DESCRIPTION OF THE DRAWINGS

For a better understanding of the invention, reference may be had to the preferred embodiment exemplary of the invention, shown in the accompanying drawings, in which.

DESCRIPTION OF THE PREFERRED EMBODIMENTS

Figure 1:
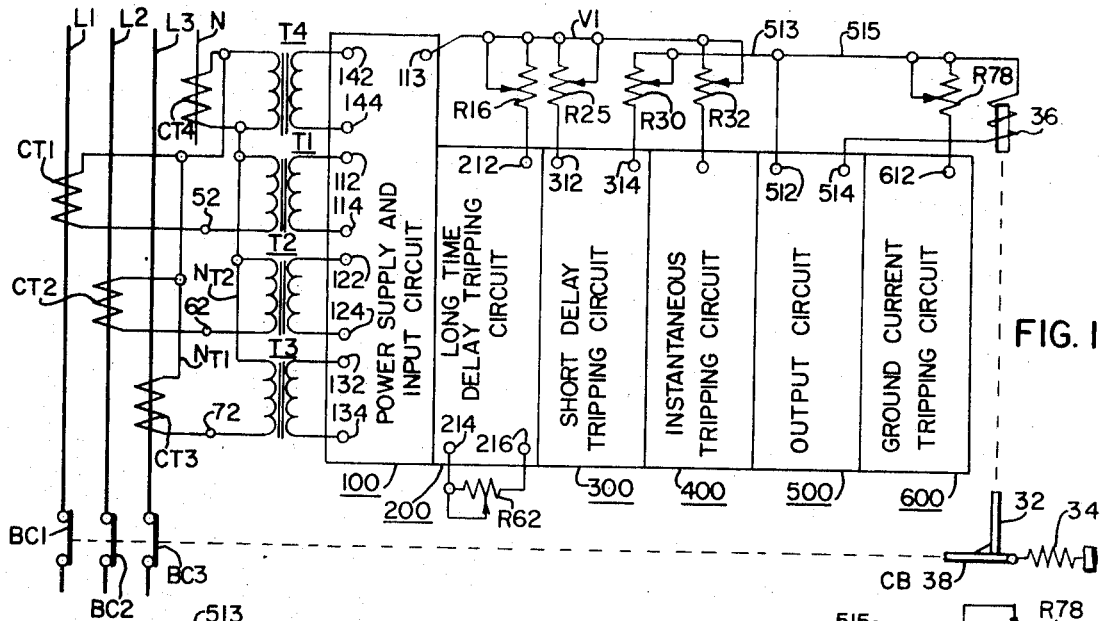
FIG. 1 is a schematic diagram, partly in block form, of a circuit breaker including a protective relay device embodying the invention and which is associated with an alternating current electrical system or circuit.

Referring now to the drawings and FIG. 1 in particular, there is illustrated a circuit breaker CB including a protective relay device associated with the line conductors L1, L2 and L3 and the neutral conductor N of an electrical power system or circuit to be protected. It will be assumed for purposes of the present description that the electrical system is a three-phase, four wire alternating current system represented by the line conductors L1, L2 and L3 and the neutral conductor N and designed for operation at a frequency of 60 hertz or cycles per second.

The circuit breaker CB is provided for segregating or isolating portions of the electrical system under certain abnormal or fault conditions such as an overcurrent condition or a ground fault condition. The circuit breaker CB includes a plurality of separable or movable line contacts BC1, BC2 and BC3 which are closed when the circuit breaker is closed and which are opened when the circuit breaker is open. The circuit breaker CB also includes a trip coil 36 which, when energized, while the circuit breaker CB is closed results in a tripping or opening operation of the circuit breaker CB. As illustrated diagrammatically in FIG. 1, energization of the trip coil 36 may actuate an operating member 32 to release a latch member 38 to thereby actuate an opening operation of the line contacts BC1, BC2 and BC3 under the influence of a suitable operating means such as the opening spring 34, which may be operatively connected to said line contacts.

In general, the protective device shown in FIG. 1 is arranged to respond to only the highest of the line currents which flow in the conductors L1, L2 and L3 to energize the trip coil 36 and to actuate the tripping of the circuit breaker CB after a time delay which is initiated when the highest of the line currents in the conductors L1, L2 and L3 exceeds a predetermined value and which varies inversely with substantially the square of the highest of the line currents in said conductors for a predetermined range of overcurrents in said conductors. Where desired, the protective device shown in FIG. 1 may also respond to the highest of the line currents in the conductors L1, L2 and L3 to energize the trip coil 36 and to actuate the tripping of the circuit breaker CB in a substantially instantaneously manner without any intentional time delay when the highest of the line currents in said conductors exceeds a predetermined value or to independently energize the trip coil 36 and to actuate the tripping of the circuit breaker CB after a substantially fixed or predetermined time delay when the highest of the line currents in said conductors exceeds a predetermined value. In addition, in accordance with the invention, the protective device shown in FIG. 1 responds to the ground current in the electrical system which includes the line conductors L1, L2 and L3 and the neutral conductor N to energize the trip coil 36 and to actuate the tripping of the circuit breaker CB after a substantially fixed or predetermined time delay when the ground current exceeds substantially a predetermined value which initiates the start of the predetermined time delay as long as the highest line current in the conductors L1, L2 and L3 remains below substantially a predetermined value or when the ground current exceeds a value which varies with the highest line current in the conductors L1, L2 and L3 after the highest line current in said conductors exceeds the last-mentioned predetermined value.

In order to obtain a plurality of output currents which are directly proportional to the line currents in the conductors L1, L2 and L3, a plurality of current transformers or sensors CT1, CT2 and CT3 are provided, as shown in FIG. 1, with the windings of said current transformers being energized in accordance with the line currents in the conductors L1, L2 and L3 respectively. In addition, in order to obtain an output current which is directly proportional to the current in the neutral conductor N, a current transformer CT4 is provided as shown in FIG. 1, with the winding of the current transformer CT4 being energized in accordance with the current in the neutral conductor N. The output windings of the current transformers CT1, CT2 and CT3 are wye connected between the neutral terminal or conductor NT1 and the respective output terminals 52, 62 and 72, respectively to provide an output current to the ground current transformer T4 which varies with the degree of unbalance of the currents in the line conductors L1, L2 and L3 where ground fault protection is desired. It is to be noted that in a four wire alternating current system, as illustrated in FIG. 1, current flows in the neutral conductor N even with no ground fault present whenever an unbalanced load causes the three phase or line currents to be unequal. During such an operating condition, the current in the neutral conductor N would not be sensed or detected by the current transformers CT1, CT2 and CT3 and a net current would flow from the conductor NT1 to the primary winding of the ground current transformer T4 which would then improperly indicate a ground fault current. The output winding of the additional current transformer CT4 is therefore connected to the primary winding of the ground current transformer T4 as shown in FIG. 1 to compensate the input current of the transformer T4 for the current flowing in the neutral conductor N. The current transformer CT4 reflects any current in the neutral conductor N to the primary winding of the transformer T4 so that all current components applied to the ground current transformer T4 from the current transformers CT1, CT2, CT3 and CT4 cancel during the operating condition when the loads connected to the line conductors L1, L2 and L3 are unbalanced, but when there is no actual ground fault. When an actual ground fault does occur in the alternating current system shown in FIG. 1, the fault current in the neutral conductor N appears only in the primary winding of the ground current transformer T4 and the alternating output current in the secondary winding of the transformer T4 is substantially proportional to only the ground fault current in the alternating current system shown in FIG. 1.

In order to further step-down the output currents of the current transformers CT1, CT2 and CT3, the intermediate transformers T1, T2 and T3 which may be of the saturating type are connected between the secondary windings of said current transformers and the input terminals of the power supply input circuit 100 of the protective device shown in FIG. 1. More specifically, the primary windings of the transformers T1, T2 and T3 are wye connected between the output terminals 52, 62 and 72, respectively of the current transformers CT1, CT2 and CT3, respectively and the neutral conductor NT2, with the neutral terminal NT2 being connected to the neutral terminal NT1 of said current transformers through the primary winding of the ground current transformer T4 in accordance with the invention. The secondary windings of the intermediate transformers I1, T2 and T3 are connected to the input terminals 112 and 114, 122 and 124 and 132 and 134, respectively of the power supply input circuit 100 of the protective device shown in FIG. 1 to provide three alternating output currents which, in turn, are directly proportional to the line currents in the conductors L1, L2 and L3 of the electrical system, as illustrated. The secondary winding of the ground current transformer T4 is connected to the input terminals 142 and 144 of the power supply input circuit 100 to provide an alternating output current which is directly proportional to the ground fault current in the alternating current system which includes the conductors L1, L2 and L3 and the neutral conductor N.

POWER SUPPLY INPUT CIRCUIT 100

Figure 2B:
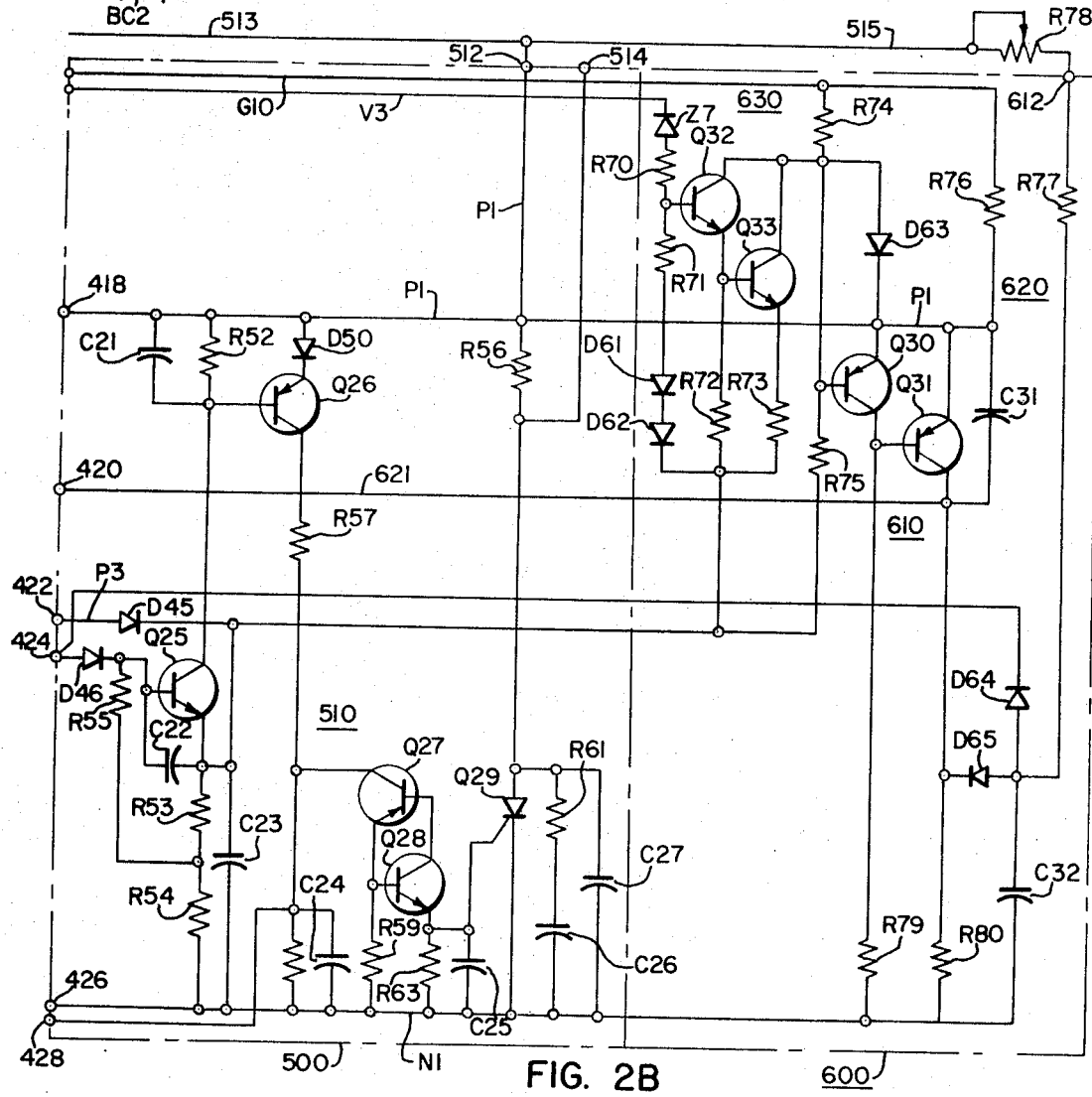
FIGS. 2A and 2B taken together is a detailed schematic diagram of the portions of the protective device which are shown in block form in FIG. 1.
Figure 2A:
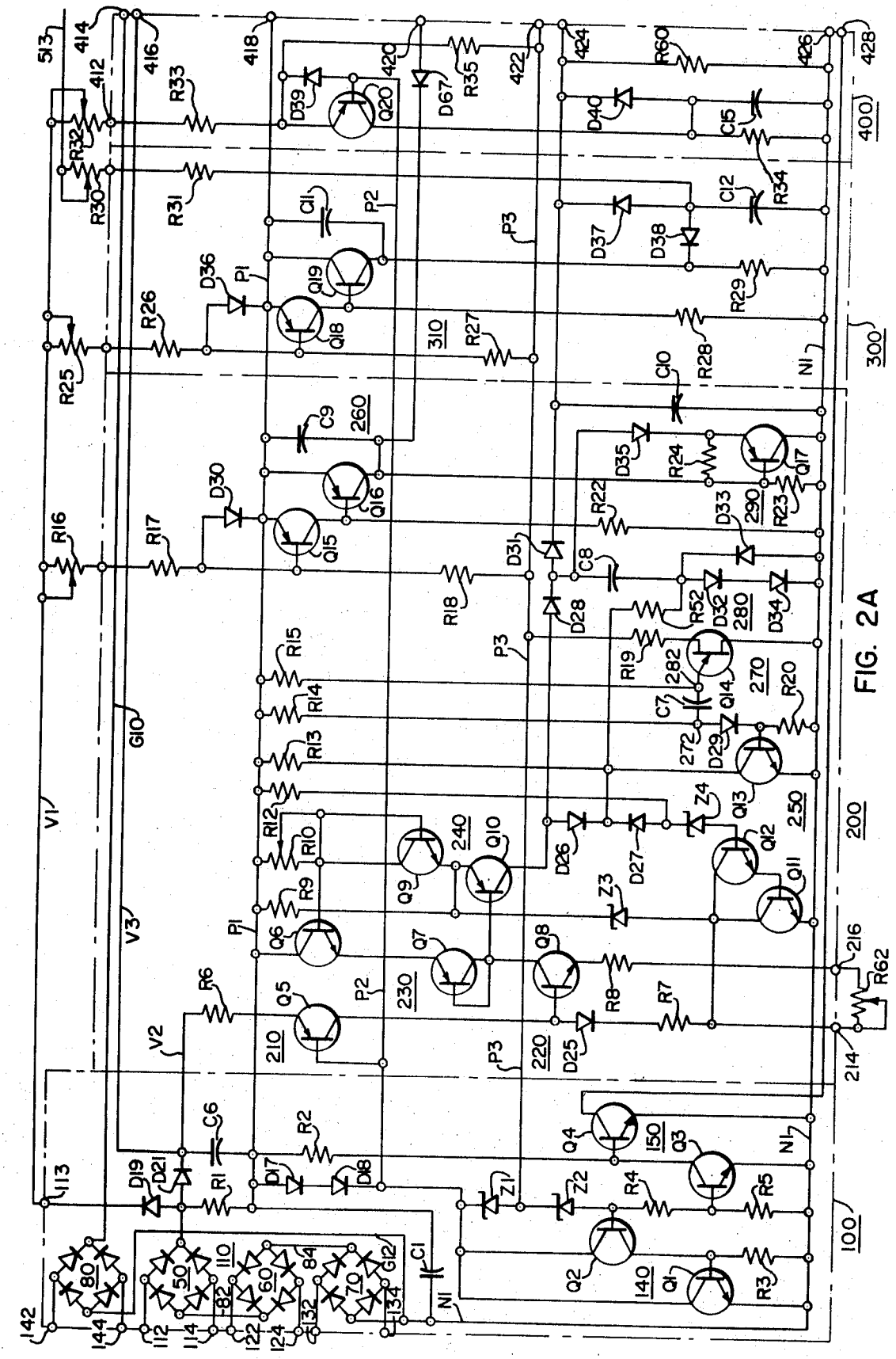

In order to rectify the alternating current outputs of the transformers T1, T2, T3 and T4, the power supply input circuit 100 of the protective device shown in FIG. 1 includes a plurality of full wave bridge type rectifiers 50, 60, 70 and 80, respectively as illustrated in FIG. 2A of the drawings. As shown in FIG. 2A, the input terminals of the full wave rectifier 50 are connected to the terminals 112 and 114 which, in turn, are connected to the secondary winding of the transformer T1. Similarly, the input terminals of the fullwave rectifiers 60, 70 and 80 at the terminals 122 and 124, 132 and 134 and 142 and 144, respectively are connected to the secondary windings of the transformers T2, T3 and T4, respectively.

In order to obtain a unidirectional current which is substantially proportional to only the highest of the line currents in the conductors L1, L2 and L3, the full wave bridge type rectifier circuits 50, 60 and 70 of the power supply input circuit 100 are connected in a current auctioneering circuit 110 of the type which is described in greater detail in copending application Ser. No. 35,517, previously mentioned. More specifically, the unidirectional output terminals of the bridge circuits 50, 60 and 70 are electrically connected in series circuit relationship by the electrical conductors 82 and 84 with the output terminals of the respective bridge circuits being poled so that the output unidirectional currents of the bridge circuits 50, 60 and 70 tend to flow in the same direction in the series circuit which includes said bridge circuits. The output current of the current auctioneering circuit 110 is available between the positive output terminal of the bridge circuit 50 and the negative output terminal of the bridge circuit 70. In order to develop a unidirectional current voltage which is substantially proportional to only the highest of the instantaneous line currents in the conductors L1, L2 and L3, the current auctioneering circuit 110 includes a resistor R1 which is connected between the positive output terminal of the bridge circuit 50 and the conductor P1. One or more filter capacitors, as indicated at C1 in FIG. 2A is connected between the conductor P1 and the negative output terminal of the bridge circuit 70 which in turn is electrically connected to a common conductor N1 of the overall static protective device or circuit shown in FIG. 1. In order to provide a plurality of regulated, filtered, unidirectional voltages or potentials for the balance of the protective device shown in FIGS. 1 and 2, a shunt voltage regulator 140 is connected electrically in parallel with the capacitor C1 between the conductor P1 and the common conductor N1 as will be described in detail hereinafter.

In the operation of the current auctioneering circuit 110, the bridge rectifier circuits 50, 60 and 70 in combination with the associated transformers T1, T2 and T3, respectively and the current transformers CT1, CT2 and CT3, respectively form a plurality of substantially constant, unidirectional current sources which are operatively connected in series circuit relation as just mentioned. As explained in greater detail in copending application Ser. No. 35,517, previously mentioned, the series circuit connection of the bridge circuits 50, 60 and 70 permits only the highest of the unidirectional output currents from said bridge circuits to flow between the positive terminal of the bridge circuit 50 and the negative terminal of the bridge circuit 70 because of the substantially constant current characteristics of the connections of the auctioneering circuit 110 just described. In other words, when the output unidirectional current of one of the bridge circuits 50, 60 and 70 is relatively greater or larger than those of the other bridge circuits, only the highest instantaneous unidirectional current from the bridge circuits 50, 60 and 70 will flow through the resistor R1 to develop a unidirectional voltage which is substantially proportional to only the highest of the instantaneous line currents flowing in the conductors L1, L2 and L3. Depending upon the relative magnitudes of the output currents of the bridge circuits 50, 60 and 70, certain diodes which form part of the bridge circuits 50, 60 and 70 and, more specifically, in the bridge circuits whose output currents are relatively less than the output current of the bridge circuit which is producing the instantaneously highest output current will functionally provide forward poled shunt or parallel circuits between the output terminals of the bridge circuits to carry the difference between the highest current which is available at the output terminals of the current auctioneering circuit 110 and the output current of the particular bridge circuit through which the highest current must flow to reach the output terminals of the current auctioneering circuit 110. It is to be noted that the upper end of the resistor R1 at the positive output terminal of the bridge circuit 50 is connected to the variable voltage output conductor or bus V1 through the forward connected diode D19 and the terminal 113. The instantaneous unidirectional output voltage of the auctioneering circuit 110 at the output conductor V1 which appears across the resistor R1 will be equal to the voltage between the conductor V1 and the conductor P1 less the forward voltage drop across the diode D19. It is important to note that unidirectional output voltage which appears between the conductors V1 and P1 is unfiltered for reasons which will be explained hereinafter. The upper end of the resistor R1 is also connected to the variable voltage output conductor or bus V2 through the forward connected diode D20. The instantaneous unidirectional output voltage of the auctioneering circuit 110 is also available between the conductors V3 and P1, the latter voltage being equal to the unidirectional voltage across the resistor R1 less the forward voltage drop across the diode D20. The unidirectional output voltage between the conductors V2 and P1 is filtered by the capacitor C6 which is connected between the conductors V2 and P1. The capacitor C6 is provided to insure that the long time delay tripping circuit 200 will respond only to the highest of the line currents flowing in the conductors L1, L2 and L3, as reflected by the instantaneous output voltage across the resistor R1, as will be explained in greater detail hereinafter.

As previously mentioned, the shunt voltage regulator 140 is electrically connected in parallel with the filter capacitor C1. More specifically, the shunt regulator circuit 140 includes a series circuit which is connected electrically in parallel with the capacitor C1 between the conductor P1 and the common conductor N1 and which includes the forward connected diodes D17 and D18, the reversely poled Zener diodes Z1 and Z2, the base-emitter circuit of the current amplifying transistor Q2 and the emitter load resistor R3. The collector of the transistor Q2 is connected to the junction point between the diode D18 and the Zener diode Z1. The shunt voltage regulator 140 also includes a second current amplifying transistor Q1 whose base is connected to the emitter of the transistor Q2 at the upper end of the resistor R3, while the emitter of the transistor Q1 is connected to the common conductor N1, as shown in FIG. 2A. The collector of the transistor Q1 is also connected to the collector of the transistor Q2 at the junction point between the diode D18 and the Zener diode Z1.

In the operation of the shunt voltage regulator circuit 140, when the power supply input circuit 100 is initially energized from the current transformers CT1, CT2 and CT3 and the associated transformers T1, T2 and T3, the output current from the current auctioneering circuit 110 which includes the bridge rectifier circuits 50, 60 and 70 flows through the resistor R1 to develop the unidirectional voltage which is substantially proportional to only the highest line current in the conductors L1, L2 and L3 and to charge the capacitor C1. The voltage across the capacitor C1 increases as the capacitor C1 is charged from the current auctioneering circuit 110 until the voltage across the capacitor C1 is sufficient to cause the Zener diodes Z1, Z2 to avalanche and limit the voltage across the capacitor C1 to substantially a predetermined value which is equal to the total of the forward voltage drops across the diodes D17 and D18, the reverse avalanche voltages across the Zener diodes Z1 and Z2 and the voltage drops across the base-emitter circuits of the transistors Q1 and Q2. The regulated and filtered voltage across the capacitor C1 which is available between the conductors P1 and N1 may, for example, be of the order of 33 volts, while the voltage available between the conductor P2 which is connected to the junction point between the diode D18 and the Zener diode Z1 and the common conductor N1 will be less than the voltage between the conductors P1 and N1 by the forward voltage drops across the diode D17 and D18. The voltage between the conductors P2 and N1 may, for example, be of the order of 31.5 volts. Similarly, the regulated, filtered voltage available between the conductor P3, which is connected to the junction point between the Zener diodes Z1 and Z2, and the common conductor N1 will be less than the voltage between the conductors P1 and N1 by the forward voltage drops across the diodes D17 and D18 and the reverse avalanche voltage across the Zener diode Z1 and may, for example, be of the order of 16 volts. It is to be noted that after the Zener diodes Z1 and Z2 avalanche during the initial charging of the capacitor C1, any changes in the current flowing through the Zener diodes Z1 and Z2 will be amplified by the current amplifying transistors Q1 and Q2. More specifically, the current which flows through the Zener diodes Z1 and Z2 also flows through the base-emitter circuit of the transistor Q2 and any change in the current which flows through said Zener diodes is amplified and results in a greater change in the collector-emitter current of the transistor Q2 to thereby appear as a change in voltage across the emitter load resistor R3. The change in current flow in the Zener diodes Z1 and Z2 is then further amplified since the change in voltage across the resistor R3 results in a change in the base-emitter current of the transistor Q1 which is further amplified by the change in the collector-emitter current of the transistor Q1. It is important to note that the shunt voltage regulator 140 as disclosed reduces the thermal requirements of the Zener diodes Z1 and Z2, since any change in the current flow required in said Zener diodes to maintain the potentials at the conductors P1, P2 and P3 which is necessary to maintain the voltages at said conductors at the desired regulated values are amplified by the transistors Q1 and Q2.

In order to prevent the operation of the overall protective device shown in FIGS. 1 and 2, prior to the time that the capacitor C1, which may include one or more energy storing capacitors in a particular application, is fully charged or in the event that the capacitor C1 should not be fully charged during the operation of the protective device shown in FIG. 1, the power supply input circuit 100 includes the control means or circuit 150 which comprises the NPN transistors Q3 and Q4, as shown in FIG. 2A. In general, the control means 150 of the power supply input circuit 100 is provided to insure that the capacitor C1 has acquired sufficient charge or stored energy to adequately energize the trip coil 36 of the circuit breaker CB when called upon to do so during the operation of the protective device shown in FIG. 1, as will be explained in greater detail hereinafter. More specifically, the control means 150 of the power supply input circuit 100 includes a voltage dividing network which comprises the resistors R4 and R5 connected in series with one another, the series circuit being electrically connected in parallel with the series circuit which includes the base-emitter circuit of the transistor Q2 and the emitter load resistor R3 between the base of the transistor Q2 and the common or negative conductor N1. When the capacitor C1 is fully charged and the Zener diodes Z1 and Z2 avalanche, the base-emitter circuits of the transistors Q1 and Q2 limit the voltage across the series circuit which includes the resistor R4 and R5 to the sum of the forward voltage drops of said base-emitter circuits. In order to apply a drive current to the base of the transistor Q3 when the capacitor C1 is fully or adequately charged, the base of the transistor Q3 is connected to the junction point between the resistors R4 and R5, while the emitter of the transistor Q3 is connected to the common conductor N1. The collector of the transistor Q3 is connected to the conductor P1 through a collector load resistor R2 and is also directly connected or coupled to the base of the transistor Q4. The emitter of the transistor Q4 is also directly connected to the common conductor N1, while the collector of the transistor Q4 is connected to the collector of the transistor Q27 which forms part of the output circuit 500, as shown in FIG. 2B, which is also the junction point between the resistors R57 and R58 at the upper side of the capacitor C24 through a conductor 534 for a purpose which will be explained in detail hereinafter.

In the operation of the control means 150, prior to the time that the charge on the capacitor C1 and the corresponding voltage thereacross is sufficient to avalanche the Zener diodes Z1 and Z2 in the reverse direction or whenever the charge on the capacitor C1 and the corresponding voltage thereacross is insufficient to avalanche said Zener diodes during the operation of the overall protective device shown in FIG. 1, the current flowing in the base-emitter circuit of the transistor Q3 will be insufficient to actuate the transistor Q3 to a saturated current carrying condition and the transistor Q3 will therefore be substantially nonconducting or cut-off. Whenever the transistor Q3 is substantially nonconducting or cut-off and a unidirectional output voltage is present at the conductor P1, current will flow from the conductor P1 to the conductor N1 through the resistor R2 and the base-emitter circuit of the transistor Q4 to actuate the transistor Q4 to a saturated condition in which the voltage drop across the collector-emitter circuit of the transistor Q4 will be relatively low or negligible and the voltage or potential at the conductor 534 will be very close to the potential at the common conductor N1. Whenever the potential at the conductor 534 is held at a value which is very close to the potential at the common conductor N1, the voltage at the collector of the transistor Q27 in the output circuit 500 will also be held at the same potential to thereby prevent the operation of the output circuit 500 of the protector device shown in FIG. 1, as will be explained in detail hereinafter.

In the operation of the control means 150, after the capacitor C1 is fully or adequately charged sufficiently to avalanche the Zener diodes Z1 and Z2 or whenever the charge on the capacitor C1 and the corresponding voltage thereacross is sufficient to avalanche said Zener diodes in the reverse direction, current will flow through the series circuit which includes the diodes D17 and D18, the Zener diodes Z1 and Z2, the resistor R4, and the base-emitter circuit of the transistor Q3 which is sufficient to actuate the transistor Q3 to a saturated condition in which the current flowing in the collector-emitter circuit of the transistor Q3 is limited only by the value of the resistor R2 which is connected in series with the collector of the transistor Q3 and the voltage between the conductors P1 and N1. When the transistor Q3 is actuated to a saturated condition as just described, the potential at the base of the transistor Q3 will change to a potential which is very close to the potential at the common conductor N1 and the current flow in the base-emitter circuit of the transistor Q4 will be reduced to a value less than that necessary to maintain the transistor Q4 in a saturated condition and the transistor Q4 will therefore be actuated to a substantially nonconducting or cut-off condition. When the transistor Q4 is actuated to a substantially nonconducting or cut-off condition, the potential at the conductor 534 with respect to the potential at the conductor N1 will be raised sufficiently to a value which will permit the output circuit 500 of the protective device shown in FIG. 1 to operate in normal fashion, since the capacitor C1 will then be assured a sufficient charge and corresponding voltage thereacross to energize the trip coil 36 of the circuit breaker CB when called upon to do so during the operation of the protective device shown in FIG. 1. It is to be noted that the value of the resistor R5 which forms part of the control means 150 may be selected so as to determine the minimum current in the base-emitter circuit of the transistor Q3 which is necessary to actuate the transistor Q3 from a substantially nonconducting or cut-off condition to a saturated condition to decrease the sensitivity of the control means 150, as desired in a particular application.

LONG TIME DELAY TRIPPING CIRCUIT 200

In general, the long time delay tripping circuit 200 is connected between the power supply input circuit 100 and the output circuit 500 of the protective device shown in FIG. 1 to respond to the unidirectional voltage developed across the resistor R1 of the auctioneering circuit 110 and the associated voltages which appear at the conductors V1 and V2 to actuate the output circuit 500 to energize the trip coil 36 of the circuit breaker CB and to trip said circuit breaker open whenever the highest of the line currents flowing in the conductors L1, L2 and L3 exceeds a predetermined value after a time delay which varies inversely with substantially the square of the overcurrent over a predetermined range of overcurrents and which is initiated when the highest of the line currents in said conductors exceeds the predetermined or threshold value or level. More specifically, the long time delay tripping circuit 200 includes a substantially constant current source or circuit 210 which is connected to the variable voltage output conductor V2 of the auctioneering circuit 110 for converting the unidirectional voltage across the resistor R1 to a first substantially predetermined unidirectional output current which is maintained at substantially a constant value for a particular value of the unidirectional voltage across the resistor R1 independently of changes in the loads connected at the output of said constant current circuit. The unidirectional output current of the constant current circuit 210 which is substantially proportional to the highest of the line currents in the conductors L1, L2 and L3, is then applied through an emitter follower circuit 220 as an input current to a circuit means 230 for producing an output voltage which varies with substantially the logarithm of the square of the first output current from the constant current circuit 210, as explained in greater detail in copending application Ser. No. 35,531, previously mentioned. The output voltage of the circuit means 230 is then applied to a circuit means 240 which is connected to the circuit means 230 and which is responsive to the output voltage of the circuit means 230 for producing a second unidirectional output current which is substantially the antilogarithm of the logarithm of the square of the first output current from the constant current circuit 210. The second output current from the circuit means 240 therefore varies with substantially the square of the highest current in the line conductors L1, L2 and L3, and the circuit means 230 considered together with the circuit means 240 comprises an overall current squaring circuit. The circuit means 270 is connected to the circuit means 240 for producing periodic output pulses of unidirectional current whose magnitude is substantially equal to that of the second output current from the circuit means 240 with the frequency or repetition rate of said pulses being of a fixed or predetermined value and with each of said pulses having a substantially predetermined or constant width or duration. A control means 250 is connected to the circuit means 270 and to the circuit means 230 and 240 to actuate the operation of the circuit means 230 and 240 only during the periodic output pulses which are produced by the circuit means 270. The output pulses of unidirectional current from the circuit means 270 are applied to a timing or integrating capacitor C8 to cumulatively charge the the capacitor C8 when permitted to do so by a level detecting circuit 260 which is connected to the variable voltage conductor V1 to permit the charging of the capacitor C8 when the highest of the line currents in the conductors L1, L2 and L3 increases above or exceeds substantially a predetermined or threshold overcurrent value. When the circuit means 270 is permitted to charge the capacitor C8 cumulatively by the operation of the level detecting circuit 260, the charge across the capacitor C8 increases gradually to a predetermined or threshold value after a time delay which varies inversely with substantially the square of the highest line current in the conductors L1, L2 and L3 to actuate the operation of the output circuit 500 of the protective device shown in FIG. 1 to energize the trip coil 36 of the circuit breaker CB. In order to periodically increase the effective voltage at the lower terminal of the capacitor C8 or to prevent a current drain or discharge from the capacitor C8 during certain operating conditions, the long time delay tripping circuit 200 may also include an auxiliary pulse circuit or switching circuit 280 which is responsive to the output pulses of the circuit means 270 to periodically increase the voltage between the lower terminal or side of the timing capacitor C8 and the common conductor N1.

More specifically, the constant current circuit 210 as shown in FIG. 2A, comprises a PNP transistor Q5 and the resistor R6 which is electrically connected in series with the emitter of the transistor Q5 between the variable voltage conductor V2 and the emitter of the transistor Q5. The base of the transistor Q5 is connected to the conductor P2 in order that the input voltage of the constant current circuit 210 between the conductors V2 and P2 include the forward voltage drops of the diodes D17 and D18 to thereby compensate the input voltage of the constant current circuit 210 for the forward voltage drop across the diode D20 and for the forward voltage drop across the base-emitter circuit of the transistor Q5. The voltage across the resistor R6 is therefore substantially equal to the voltage across the resistor R1. The emitter current of the transistor Q5 is therefore equal to the ratio of the voltage across the resistor R1 to the value of the resistor R9 which is connected in series with the emitter of the transistor Q5. The unidirectional output current of the constant current circuit 210 is available at the collector of the transistor Q5.

In order to maintain the unidirectional output current of the constant current circuit 210 at substantially a predetermined value for a particular value of the voltage across the resistor R1, the input voltage applied across the series circuit which includes the resistor R6 and the emitter-base circuit of the transistor Q5 should be relatively high, such as in the order of ten to twenty times the forward voltage drop across the emitter-base circuit of the transistor Q5. In addition, the transistor Q5 should have a relatively high current gain or ratio of emitter current to base current, such as of the order of 100, at the particular level of output current at which the transistor Q5 is operating in order that the base current of the transistor Q5 be negligible compared with the emitter current and to insure that the collector current of the transistor Q5 be substantially equal to the emitter current. In the operation of the constant current circuit 210, the unidirectional output current at the collector of the transistor Q5 is maintained at substantially a predetermined or constant value for a particular value of the voltage across the resistor R1 independent of changes in the load circuit which is connected to the collector of the transistor Q5 and the unidirectional output current at the collector of the transistor Q5 is substantially proportional to the voltage across the resistor R1 and, in turn, with the highest line current in the conductors L1, L2 and L3.

The emitter follower circuit 220 is connected, in general, to the constant current circuit 210 in order to apply an input current to the circuit means 230 which is substantially proportional to the first unidirectional output current of the constant current circuit 210. More specifically, the emitter-follower circuit 220 comprises a NPN transistor Q8 whose base is connected to the collector of the transistor Q5 of the constant current circuit 210. The base of the transistor Q8 is also connected to the common conductor N1 through a series circuit which includes the forward connected diode D25, the resistor R7 and the collector-emitter circuit of the transistor Q11 of the control means 250, as will be described hereinafter. The emitter of the transistor Q8 is connected to the common conductor N1 through a series circuit which includes the resistor R8, the rheostat R62 and the collector-emitter circuit of the transistor Q11. The collector of the transistor Q8 is connected to the base and to the collector of the transistor Q7 which are connected together and which form part of the circuit means 230. It is to be noted that the series circuit which includes the diode D25 and the resistor R7 is electrically connected in parallel with the series circuit which includes the base-emitter circuit of the transistor Q8, the resistor R8 and the rheostat R62 and that the diode D25 is provided to compensate the forward voltage drop across the base-emitter circuit of the transistor Q8 in order that the voltage across the resistor R7 be substantially equal to the total or sum of the voltages across the resistor R8 and the rheostat R62 during the operation of the emitter-follower circuit 220.

In considering the operation of the emitter-follower circuit 220, it will be assumed that the transistor Q11 is in a substantially saturated operating condition to which it is periodically actuated by the operation of the circuit means 270, as will be explained hereinafter, and that the potential at the collector of the transistor Q11 is therefore relatively close to the potential at the common conductor N1. In the operation of the emitter-follower circuit 220, assuming that the transistor Q11 is in a substantially saturated condition, when the unidirectional output current flows from the collector of the transistor Q5 of the constant current circuit 210, the voltage drop across the resistor R7 will be substantially equal to the sum of the voltages across the resistor R8 and the adjustable rheostat R62. In other words, the product of the output current from the collector of the transistor Q5 times the resistance of the resistor R7 will be substantially equal to the product of the collector-emitter current of the transistor Q8 times the sum of the resistances of the resistor R8 and the rheostat R62. The collector-emitter current of the transistor Q8 will therefore be equal to the ratio of the resistance of the resistor R7 times the output current of the constant current circuit 210 to the sum of the resistances of the resistor R8 and the rheostat R62. It is to be noted that the level of the collector-emitter current of the transistor Q8 for a particular output current from the transistor Q5 of the constant current circuit 210 may therefore be adjusted by the setting of the adjustable rheostat R62 to thereby vary the effective time delay of the long time delay tripping circuit 200. It is to be noted that the output current of the emitter-follower circuit 220 flows in the collector-emitter circuit of the transistor Q8 and is applied as an input current to the circuit means 230 to which the collector of the transistor Q8 is connected. The latter input current to the circuit means 230 is indicated in FIG. 2A as $I_{IN}$.

In general, the circuit means 230 is connected to the emitter-follower circuit 220 for producing an output voltage which is substantially proportional to the natural logarithm of the square of the output current from the constant current circuit 210 and, in turn, is substantially proportional to the natural logarithm of the square of the output current of the emitter-follower circuit 220, as indicated by the current $I_{IN}$, as just mentioned. The circuit means 230 comprises the NPN transistor Q6 and the PNP transistor Q7. As shown in FIG. 2A, the emitter-base circuit of the transistor Q7 is connected in series with the collector of the transistor Q8 of the emitter-follower circuit 220 with the collector of the transistor Q7 being connected to the base of the transistor Q7 and also to the collector of the transistor Q8. The base-emitter circuit of the transistor Q6 is connected in series circuit relation with the emitter-base circuit of the transistor Q7. More specifically, the emitter of the transistor Q6 is connected to the emitter of the transistor Q7 and the base of the transistor Q6 is connected to the junction point between the rheostat R10 and the collector of the transistor Q9 which form part of the circuit means 240. The collector of the transistor Q6 is connected to the conductor P1. The unidirectional output voltage of the circuit means 230 is available between the base of the transistor Q6 and the base of the transistor Q7 which is also connected to the base of the transistor Q10 which forms part of the circuit means 240.

The operation of the circuit means 230 is based upon the relationship between the emitter current and the base-emitter voltage of a silicon transistor, as explained in detail in copending application Ser. No. 35,531, previously mentioned. More specifically, the base-emitter voltage of a silicon transistor is substantially proportional to the natural logarithm of the emitter current of such a transistor. Since the output voltage of the circuit means 230 which appears between the base of the transistor Q6 and the base of the transistor Q7 is equal to the sum of the base-emitter voltages of the transistors Q6 and Q7, the output voltage of the circuit means 230 is substantially proportional to the natural logarithm of the square of the input current $I_{IN}$, as explained in detail in the last mentioned copending application.

In general, the circuit means 240 is connected to the circuit means 230 to be responsive to the output voltage of the circuit means 230 for producing a second unidirectional output current, as indicated as $I_0$ in FIG. 2A which is substantially the antilogarithm of the natural logarithm of the square of the first output current from the constant current circuit 210 which is applied to or coupled to the circuit means 230 as the input current $I_{IN}$. More specifically, the circuit means 240 comprises the NPN transistor Q9 and the PNP transistor Q10. The base of the transistor Q6 of the circuit means 230 is connected to the base and to the collector of the transistor Q9 which are connected together. The collector and the base of the transistor Q9 are also connected to the conductor P1 through the rheostat R10, as shown in FIG. 2A. The base-emitter circuit of the transistor Q9 is connected in series circuit relation with the emitter-base circuit of the transistor Q10 with the emitter of the transistor Q9 being connected to the emitter of the transistor Q10. The base of the transistor Q10 is connected to the base of the transistor Q7 which forms part of the circuit means 230. The output current $I_0$ of the circuit means 240 is available at the collector of the transistor Q10, as indicated in FIG. 2A. In order to apply a substantially constant or predetermined current to the base-emitter circuit of the transistor Q9 to assist in temperature compensating the squaring circuit which includes both the circuit means 230 and the circuit means 240, the emitter of the transistor Q9 is connected to the junction point between the current limiting resistor R9 and the Zener diode Z3. The other end of the resistor R9 is connected to the conductor P1 with the resistor R9 being connected in series circuit relation with the Zener diode Z3 and the collector-emitter circuit of the transistor Q11 which forms part of the control means 250. The series circuit which includes the resistor R9, the Zener diode Z3 and the collector-emitter circuit of the transistor Q11 is therefore connected between the conductor P1 and the common conductor N1.

In the operation of the circuit means 240, it will be assumed that the transistor Q11 of the control means 250 is in a substantially saturated condition which is necessary for the operation of the emitter-follower circuit 220, the circuit means 230 and the circuit means 240 and to which the transistor Q11 is periodically actuated by the operation of the circuit means 270, as will be explained hereinafter. In the operation of the circuit means 240, the output voltage of the circuit means 230 is applied as an input signal to the circuit means 240 across the series circuit which includes the base-emitter circuits of the transistors Q9 and Q10. In the operation of the circuit means 240, assuming that the transistor Q11 is in a substantially saturated condition, the collector of the transistor Q11 is clamped or held at a potential which is relatively close to the potential at the common conductor N1 and the potential at the emitter of the transistor Q9 is maintained at a substantially predetermined, regulated potential by the operation of the Zener diode Z3 which avalanches whenever the transistor Q11 is in a substantially saturated condition due to the potential between the conductor P1 and the common conductor N1. Whenever the predetermined potential is applied to the emitter of the transistor Q9, a substantially constant or predetermined current will flow from the conductor P1 through the rheostat R10, the base-emitter circuit of the transistor Q9 to the common conductor N1 through the Zener diode Z3 and the collector-emitter circuit of the transistor Q11.

Since the output voltage of the circuit means 230 is substantially equal to the sum of the base-emitter voltages of the transistor Q9 and Q10 whose base-emitter circuits are electrically connected in series and considering the logarithmic relationship between the emitter current and the base-emitter voltage of each of the transistors Q9 and Q10, as explained in detail in the last-mentioned copending application, the output current of the circuit means 240 at the collector of the transistor Q10 is substantially proportional to the antilogarithm of the natural logarithm of $I_{IN}^2$ or is substantially proportional to the square of the input $I_{IN}$ of the squaring circuit which includes the circuit means 230 and the circuit means 240.

As previously mentioned, the circuit means 270 is connected to the circuit means 240 in order to control the application of the unidirectional output current from the circuit means 240 to the timing capacitor C8 in the form of periodic pulses of current having a predetermined or constant frequency or repetition rate and having a predetermined or constant width or duration and of a magnitude which is substantially proportional to the square of the highest line current in the conductors L1, L2 and L3, as reflected by the output current $I_0$ of the circuit means 240, when permitted to do so by the operation of the level detecting circuit 260 which will be described hereinafter.

More specifically, the circuit means 270 comprises a breakover device, such as the unijunction transistor or double-base diode Q14, the NPN transistor Q13 and the energy storing capacitor C7. The lower base of the unijunction transistor Q14 is connected to the common conductor N1, while the upper base of the transistor Q14 is connected to the conductor P3 through the resistor R19 to apply a substantially predetermined or constant interbase potential to unijunction transistor Q14 prior to the breakover of the transistor Q14. The emitter of the transistor Q14 is connected to the right side of the capacitor C7 at the terminal 282, as shown in FIG. 2A, and also to the conductor P1 through the resistor R15. The left side of the capacitor C7 at the terminal 272 is connected to the conductor P1 through the resistor R14 and also to the base of the transistor Q13 through the diode D29. The base of the transistor Q13 is connected to the common conductor N1 through the resistor R20 which acts as a shunt resistor electrically in parallel with the base-emitter circuit of the transistor Q13 to decrease the sensitivity of the transistor Q13 and to establish the minimum current in the base-emitter circuit of the transistor Q13 which is necessary to actuate the transistor Q13 from a normally nonconducting or cut-off condition to a saturated or substantially conducting condition. The emitter of the transistor Q13 is connected to the common conductor N1, while the collector of the transistor Q13 is connected to the conductor P1 through the resistor R13 and to the collector of the transistor Q10 which forms part of the circuit means 240 through the forward connected diode D26. It is to be noted that the resistor R19 which is connected between the upper base of the unijunction transistor Q14 and the conductor P3 also assists in temperature compensating the circuit means 270 for changes in the operating characteristics of unijunction transistor Q14 which result from changes in the environmental temperature.

In general, the circuit means 270 operates as a relaxation oscillator or sawtooth voltage generator which depends upon the operating characteristics of the particular breakover device which is employed as part of the circuit means 270 and which, as illustrated, is the unijunction transistor Q14. The typical operating characteristics of a suitable breakover device such as the unijunction transistor Q14, a four-layer diode, a transistor breakover circuit or other suitable circuit is such that when the voltage or potential applied between certain terminals, such as the emitter and the lower base of the transistor Q14, exceeds substantially a predetermined fraction or percentage of the potential applied between certain other terminals, such as the upper base and the lower base of the transistor Q14, which may be referred to as the peak point voltage of the transistor Q14, the resistance or impedance between the emitter and the lower base of the transistor Q14 will decrease suddenly until the voltage between the emitter and the lower base of the transistor Q14 decreases to a relatively much lower voltage, which may be referred to as the valley voltage of the transistor Q14, as disclosed in greater detail in copending application Ser. No. 765,584 previously mentioned.

In considering the detailed operation of the circuit means 270, it will be assumed initially that the voltage applied between the emitter and the lower base of the transistor Q14 is less than the peak point voltage necessary to cause the transistor Q14 to breakover and that the transistor Q13 is being held in a substantially saturated condition by the base drive current which flows from the conductor P1 through the resistor R14, the forward connected diode D29 and the base-emitter circuit of the transistor Q13 to the common conductor N1. It is to be noted that during the assumed initial operating condition, the left side of the capacitor C7 at the terminal 272 will be held at a positive potential with respect to the common conductor N1 which is equal to the sum of the forward voltage drops across the diode D29 and the base-emitter circuit of the transistor Q13. It is also to be noted that the unidirectional output current $I_0$ from the circuit means 240 when such output current is available from the circuit means 240 at the collector of the transistor Q10 will be diverted away from the timing capacitor C8 through the collector-emitter path of the transistor Q13 to the common conductor N1 as long as the diode D29 is forward biased and the transistor Q13 is held in a saturated operating condition.

In the operation of the circuit means 270, prior to the breakover of the unijunction transistor Q14, a charging current will flow to the right side of the capacitor C7 from the conductor P1 through the resistor R15 to gradually charge the capacitor C7 in a substantially linear manner until the voltage at the terminal 282 at the right side of the capacitor C7 exceeds the peak point voltage of the unijunction transistor Q14. When the voltage at the terminal 282 exceeds the peak point voltage of the transistor Q14, the transistor Q14 breaks over and the voltage at the terminal 282 suddenly decreases from the peak point voltage to the valley voltage of the transistor Q14 with a resulting voltage change at the terminal 282 which is equal to the difference between the peak point voltage and the valley voltage of the transistor Q14. For example, the potential at the terminal 282 may decrease suddenly from a voltage of approximately 10 volts which is positive with respect to the potential at the conductor N1 to a valley voltage of approximately 3 volts which is positive with respect to the potential at the conductor N1 when the transistor Q14 breaks over during the charging of the capacitor C7. It is to be noted that prior to the breakover of the transistor Q14, the voltage across the capacitor C7 will increase due to the charging current from the regulated potential at the conductor P1 to approximately the voltage at the terminal 282 which may, for example, be approximately 10 volts which is positive with respect to the potential at the conductor N1 less the two forward voltage drops across the diode D29 and the base-emitter circuit of the transistor Q13 or the net voltage across the capacitor C7 may be approximately 9.4 volts prior to the breakover of the transistor Q14. When the transistor Q14 breaks over and the voltage at the terminal 282 suddenly decreases to the valley voltage of the transistor Q14, the voltage at the terminal 272 at the other side of the capacitor C7 will change correspondingly in a negative direction substantially instantaneously since there is no low resistance discharge path provided for the capacitor C7.

The voltage at the terminal 272 at the left side of the capacitor C7 will then change in a negative direction to a value which is equal, for example, to a voltage of 3 volts which is positive with respect to the potential at the conductor N1 less 9.4 volts which is the approximate voltage across the capacitor C7 resulting in a voltage which is approximately equal to 6.4 volts which is instantaneously negative with respect to the potential at the conductor N1. When the transistor Q14 breaks over and the voltage at the terminal 272 changes as just described, the diode D29 will then be reverse biased and the transistor Q13 will be actuated from a normally saturated operating condition to a substantially nonconducting condition since the base drive current will be effectively removed from the base-emitter circuit of the transistor Q13.

When the voltage at the left side of the capacitor C7 changes in a negative direction to a voltage value which is negative with respect to the voltage at the conductor N1, the left side of the capacitor C7 will then be charged from the conductor P1 through the resistor R14 with the charging current flowing through the emitter and the lower base of the transistor Q14 to the conductor N1. The voltage at the terminal 272 will gradually increase in a positive direction until the diode D29 is forward biased and the drive current in the base-emitter circuit of the transistor Q13 actuates the transistor Q13 to substantially a saturated operating condition. It is to be noted that the transistor Q14 will be held in a substantially conducting condition in the circuit which includes the emitter and the lower base of the transistor Q14 by the charging current which flows from the conductor P1 to the left side of the capacitor C7 until the diode D29 becomes forward biased and the transistor Q13 is actuated to substantially a saturated condition. When the transistor Q14 is no longer held in a substantially conducting condition in the circuit which includes the emitter and the lower base of the transistor Q14, the transistor Q14 will then be reset to substantially a nonconducting condition in the emitter-lower base circuit. The time interval required to charge the left side of the capacitor C7 at the terminal 272 following the breakover of the transistor Q14 is determined by the time constant of the resistor-capacitor combination which includes the resistor R14 and the capacitor C7 which is charged from the voltage between the positive conductor P1 and the conductor N1.

While the transistor Q13 is rendered substantially nonconducting for substantially a predetermined time interval following the breakover of the transistor Q14, a pulse of unidirectional current at the collector of the transistor Q10 of the circuit means 240 is diverted from the collector-emitter circuit of the transistor Q13 to a current path which includes the diode D28 and is applied to charge the timing capacitor C8 when permitted to do so by the operation of the level detecting circuit 260, as will be explained hereinafter. The pulses of current which are periodically available from the collector of of the transistor Q10 and which are diverted from the emitter-collector circuit of the transistor Q13 to the current path which includes the diode D28 will have a magnitude or amplitude which is substantially proportional to the square of the highest line current flowing in the conductors L1, L2 and L3, as previously explained. Since the time required to charge the capacitor C7 and periodically break over the transistor Q14 is determined by the regulated potential at the conductor P1 and the resistance value of the resistor R15, as well as by the capacitance value of the capacitor C7, the frequency or repetition rate of the output current pulses from the circuit means 270 will be maintained at substantially a predetermined or constant value. Similarly, it is to be noted that the periodic pulses of output current which are applied from the collector of the transistor Q10 to the current path which includes the diode D28 occur at the end of each sawtooth voltage waveform which is produced or generated by the circuit means 270 and that the duration of the pulses is determined by the time required to charge the left side of the capacitor C7 from the regulated potential at the conductor P1 through the resistor R14 to sufficiently forward bias the diode D29 and to actuate the transistor Q13 to substantially a saturated operating condition following the breakover of the transistor Q14. The duration of each of the periodic pulses of output current from the circuit means 270 will therefore remain substantially constant or at a predetermined value, since the time width of each of said pulses will be substantially independent of variations in the highest line current which flows in the conductors L1, L2 and L3 and the corresponding voltage across the resistor R1. When the circuit means 270 is permitted to charge the timing capacitor C8 with periodic output pulses of current obtained from the circuit means 240 by the operation of the level detecting means 260 as will be explained hereinafter, the average charging current applied to the capacitor C8 will vary substantially with the square of the unidirectional voltage across the resistor R1 and, in turn, with substantially the square of the highest line current flowing in the conductors L1, L2 and L3.

In order to actuate the operation of the circuit means 230 and the circuit means 240 only during the periodic output pulses of current which are actuated by the operation of the circuit means 270 as just described, the control means 250 is connected between the circuit means 230 and 240 and the circuit means 270, as shown in FIG. 2A. More specifically, the control means 250 comprises the NPN transistors Q11 and Q12. The collector-emitter circuit of the transistor Q11 is connected in series with the Zener diode Z3 and the current limiting resistor R9 between the conductor P1 and the conductor N1 to which the emitter of the transistor Q11 is connected. The base of the transistor Q11 is connected to the emitter of the transistor Q12, while the base of the transistor Q12 is connected to the conductor P1 through a series circuit which includes the reversely poled Zener diode Z4 and the current limiting resistor R12. The junction point between the Zener diode Z4 and the resistor R12 is also connected to the conductor N1 through the diode D27 and the collector-emitter circuit of the transistor Q13 which forms part of the circuit means 270 as previously described. As previously mentioned, the collector of the transistor Q11 is connected to the circuit means 240 through the Zener diode Z3 to the emitter-follower circuit 220 through the resistor R7 and the rheostat R62 and to the circuit means 230 through the emitter follower circuit 220.

In the operation of the control means 250, as explained in greater detail in copending application Ser. No. 40,616 previously mentioned, it will be assumed initially that the transistor Q13 is in a normally saturated operating condition in the absence of periodic output pulses from the circuit means 270 and that the potential at the junction point between the Zener diode Z4 and the diode D27 is therefore normally held at a potential with respect to the conductor N1 which is the sum of the forward voltage drops across the diode D27 and the collector-emitter circuit of the transistor Q13 which is insufficient to avalanche the Zener diode Z4. As long as the Zener diode Z4 does not avalanche, the transistors Q11 and Q12 will remain in their normal substantially nonconducting conditions due to the absence of a base drive current and the emitter follower circuit 220, the circuit means 230 and the circuit means 240 are all prevented from operating since the operation of each of the latter circuits requires a current carrying or conducting path through the collector-emitter circuit of the transistor Q11 to the common conductor N.

When the transistor Q14 of the circuit means 270 breaks over to start one of the periodic output pulses from the circuit means 270, the transistor Q13 is actuated from a substantially saturated operating condition to substantially a nonconducting condition to thereby reverse bias the diode D27 and the potential at the junction point between the Zener diode Z4 and the diode D27 increases to a value which is sufficient to avalanche the Zener diode Z4. A base drive current will then flow through the base-emitter circuits of the transistors Q11 and Q12 to the conductor N1 to actuate said transistors to substantially a saturated operating condition. When the transistor Q11 is actuated to a substantially saturated operating condition, the emitter follower circuit 220, the circuit means 230 and the circuit means 240 are also actuated to operating conditions, as previously explained. At the end of each periodic output pulse from the circuit means 270 when the transistor Q13 is restored to a substantially saturated condition, the transistors Q11 and Q12 are restored to their normally substantially nonconducting conditions to thereby actuate the emitter follower circuit 220, the circuit means 230 and the circuit means 240 to inoperative conditions.

In summary, the circuit means 270 operates to produce periodic pulses of output current to charge the timing capacitor C8 when permitted to do so by the operation of the level detecting circuit 260 with the frequency and the duration of said pulses being maintained at substantially predetermined or constant values and the magnitude of the pulses varying with substantially the square of the highest line current in the conductors L1, L2 and L3. As just mentioned, the emitter follower circuit 220, the circuit means 230 and the circuit means 240 are actuated to operate only during the periodic output pulses of current which are produced by the circuit means 270 due to the operation of the control means 250, as just described.

In general, the level detecting circuit 260 of the long time delay tripping circuit 200 is connected to the auctioneering circuit 110 and to the timing or integrating capacitor C8 to respond to the instantaneous unidirectional voltage across the resistor R1 and, in turn, to the highest instantaneous line current flowing in the conductors L1, L2 and L3 to permit the circuit means 270 to start charging the capacitor C8 when the highest instantaneous line current in said conductors exceeds a predetermined value, as described in greater detail in copending application Ser. No. 765,582, previously mentioned. The highest line current to which the level detecting circuit 260 responds is adjustable by the setting of the rheostat R16 to any value within a predetermined operating range which may for example, be between 50 and 120 percent of the continuous current rating of the circuit breaker CB, as reflected by the current ratings of the current transformers CT1, CT2 and CT3 shown in FIG. 1. In a typical application, for example, the current rating of the circuit breaker CB might be 1,000 amperes and the ratio between the currents in the line conductors L1, L2 and L3 and the output currents of the associated current transformers CT1, CT2 and CT3, respectively, might, for example, be substantially 200 so that when the current in one of said line conductors is 1,000 amperes, the corresponding output current of the associated current transformer would be substantially 5 amperes. It is to be noted that the current in each of the line conductors L1, L2 and L3 also corresponds to the current which flows in the respective contacts BC1, BC2 and BC3 of the circuit breaker CB as shown in FIG. 1. The level detecting circuit 260 includes the PNP transistors Q15 and Q16 which are connected to control the conducting state of the control means 290 which comprises a PNP transistor Q17 which is connected to normally divert the output pulses of current from the circuit means 270 away from the timing capacitor C8 to the common conductor N1.

More specifically, the input circuit of the level detecting circuit 260 comprises a voltage dividing network which includes the rheostat R16, the resistor R17 and the resistor R18 which are connected in series with one another, the series circuit being connected between the conductor V1 of the auctioneering circuit 110 and the conductor P3 which provides one of the regulated unidirectional output voltages from the power supply input circuit 100. It is important to note that the unidirectional voltage at the variable voltage conductor V1 varies instantaneously with only the highest line current in the conductors L1, L2 and L3 which corresponds to the instantaneous voltage across the resistor R1, since the voltage at the conductor V1 is not filtered by the capacitor C6 as is the output voltage at the conductor V2. The base of the transistor Q15 is connected to the junction point between the resistors R17 and R18, while the emitter of the transistor Q15 is connected to the conductor P1. The diode D30 is connected between the base and the emitter of the transistor Q15 to limit the inverse voltage which is applied between the emitter and the base of the transistor Q15 when the transistor Q15 is substantially nonconducting and to prevent the base-emitter circuit of the transistor Q15 from breaking down under the inverse voltage which might otherwise be applied to the base-emitter circuit of the transistor Q15. The collector of the transistor Q15 is connected to the conductor N1 through the collector load resistor R22. The transistor Q16 is directly coupled to the output of the transistor Q15 since the base of the transistor Q16 is connected to the collector of the transistor Q15, while the emitter of the transistor Q16 is connected to the conductor P1. The collector of the transistor Q16 is connected to the conductor N1 through the collector load resistor R23. The capacitor C9 is connected between the emitter and the collector of the transistor Q16 to cooperate with the resistor R23 to delay the resetting of the level detecting circuit 260, as will be explained hereinafter. The transistor Q17 which comprises the control means 290 is directly coupled to the transistor Q16 with the collector of the transistor Q16 being connected to the base of the transistor Q17. The collector of the transistor Q17 is connected to the conductor N1, while the emitter of the transistor Q17 is connected to the upper side of the timing capacitor C8 and to the junction point between the diodes D28 and D31 through the normally forward connected diode D35. The resistor R24 is connected between the base and the emitter of the transistor Q17 to decrease the sensitivity of operation of the transistor Q17 and to establish the minimum emitter-base current necessary to actuate the transistor Q17 to a saturated operating condition.

In the operation of the level detecting circuit 260, when the highest instantaneous current flowing in the conductors L1, L2 and L3 is less than substantially a predetermined value and the corresponding voltage across the resistor R1 is less than a substantially predetermined voltage, the transistor Q15 of the level detecting circuit 260 is actuated to substantially a saturated operating condition since the emitter-base circuit of the transistor Q15 is forward biased and a base drive current flows from the conductor P1 through the emitter-base circuit of the transistor Q15 and the resistor R18 to the conductor P3. When the transistor Q15 is in the normally saturated condition, the voltage drop across the resistor R18 due to the current which flows in the rheostat R16 and the resistor R17 and the current which flows in the emitter-base circuit of the transistor Q15 is equal to the voltage difference between the conductors P1 and P3 less the forward voltage drop across the emitter-base circuit of the transistor Q15. In other words, when the transistor Q15 is in a normally saturated condition, the voltage at the base of the transistor Q15 will differ from the voltage at the conductor P1 only by the forward voltage drop of the emitter-base circuit of the transistor Q15. The sum of the instantaneous voltage drops across the rheostat R16 and the resistor R17 will be substantially equal to the unidirectional voltage across the resistor R1 since the rheostat R16 and the resistor R17 are connected in series with each other between the conductor V1 and the base of the transistor Q15 which normally differs from the voltage at the conductor P1 by the forward voltage drop across the emitter-base circuit of the transistor Q15. Since the sum of the voltage drops across the rheostat R16 and the resistor R17 is substantially equal to the unidirectional voltage across the resistor R1, the current flowing through the rheostat R16 and the resistor R17 will be substantially equal to the unidirectional voltage across the resistor R1 divided by the sum of the resistances of the rheostat R16 and the resistor R17.

As the voltage across the resistor R1 increases prior to reaching the predetermined value to which the level detecting circuit 260 responds as previously mentioned, the current which flows through rheostat R16 and the resistor R17 will increase correspondingly, while the current which flows through the emitter-base circuit of the transistor Q15 decreases. This is because the voltage across the resistor R18 is constrained to be equal to the voltage difference between the conductors P1 and P3 less the forward voltage drop across the emitter-base circuit of the transistor Q15 as long as the transistor Q15 remains in a saturated condition. As long as the transistor Q15 remains in a saturated condition, the current which flows from the conductor P1 through the resistor R22 will flow through the emitter-collector circuit of the transistor Q15 rather than through the emitter-base circuit of the transistor Q16 and maintain the transistor Q16 in a substantially nonconducting condition. As long as the transistor Q16 is maintained in a substantially nonconducting condition, the current flow through the emitter-collector circuit of the transistor Q16 will be substantially negligible and the voltage drop across the resistor R23 will be relatively low. The voltage at the base of the transistor Q17 which is connected to the upper end of the resistor R23 will therefore be at a value which is relatively close to the voltage at the conductor N1 and a base drive current will flow from the junction point between the diodes D28 and D31 at the upper side of the timing capacitor C8 whenever the periodic output pulses of current are applied through the diode D28 by the circuit means 270 with the base drive current flowing to the emitter-base circuit of the transistor Q17 through the diode D35 and the resistor R23 to the common conductor N1. The transistor Q17 will therefore be maintained in a substantially saturated condition whenever the output pulses of current are applied from the circuit means 270 through the diode D28 toward the capacitor C8 to thereby provide a relatively low resistance current path from the upper side of the timing capacitor C8 through the forward connected diode D35 and, the emitter collector circuit of the transistor Q17 to the common conductor N1 to thereby prevent the output pulses of current from the circuit means 270 from cumulatively charging the timing capacitor C8. It is to be noted that in the normal operating condition of the level detecting circuit 260, as long as the highest instantaneous line current flowing in the conductors L1, L2 and L3 remains below the predetermined or threshold value, previously mentioned, and the corresponding unidirectional voltage across the resistor R1 remains below a corresponding predetermined value, the transistor Q16 will remain in a substantially nonconducting condition and the capacitor C9 will charge to a voltage which is substantially equal to the voltage difference between the conductors P1 and N1 less a relatively small voltage drop across the resistor R23.

When the highest instantaneous line current flowing in the conductors L1, L2 and L3 exceeds the predetermined value to which the level detecting circuit 260 is adjusted to respond by the setting of the rheostat R16 and the unidirectional voltage across the resistor R1 exceeds a corresponding predetermined voltage value, the current through the rheostat R16 and the resistor R17 will increase, while the transistor Q15 is still in a saturated condition until the current in the emitter-base circuit of the transistor Q15 decreases to a negligible value and the transistor Q15 is actuated to a substantially nonconducting condition. When the transistor Q15 is actuated to a substantially nonconducting condition, the current in the emitter-collector circuit of the transistor Q15 will decrease to a substantially negligible value and the current which flows in the resistor R22 will flow from the conductor P1 through the emitter-base circuit of the transistor Q16. The transistor Q16 is then actuated to a saturated condition and carries saturated current in the emitter-collector circuit of the transistor Q16 to increase the voltage drop across the resistor R23. The voltage at the base of the transistor Q17 which is connected to the upper end of the resistor R23 then increases to a value which is substantially equal to the voltage at the emitter of the transistor Q17 to thereby remove the forward bias of the emitter-base circuit of the transistor Q17 and the to prevent the transistor Q17 from being actuated to a substantially saturated condition. When the transistor Q17 which forms the control means 290 is prevented from being actuated to a substantially saturated condition by the base drive current which is normally permitted to flow from the upper side of the timing capacitor C8 during the pulses of output current produced by the circuit means 270, the low resistance path between the upper side of the timing capacitor C8 and the conductor N1 through the diode D35 is operatively eliminated and the capacitor C8 is then permitted to accumulate a charge from the output pulses of current from the circuit means 270 with the voltage across the timing capacitor C8 increasing in accordance with substantially the square of the voltage across the resistor R1 and, in turn, with substantially the square of the highest line current flowing in the conductors L1, L2 and L3.

When the transistor Q16 is actuated to a substantially saturated condition in response to a predetermined overload current flowing in one of the conductors L1, L2 and L3, the capacitor C9 which was previously charged up to a voltage equal to the difference in voltage between the conductors P1 and N1 less the voltage drop across the resistor R23 will rapidly discharge through the emitter-collector circuit of the transistor Q16 until the capacitor C9 is substantially completely discharged. If the highest current flowing in the conductors L1, L2 and L3 and the corresponding voltage across the resistor R1 should instantaneously decrease to a value below the predetermined value previously mentioned after the level detecting circuit 260 has operated to actuate the transistor Q17 to a substantially nonconducting condition and to prevent the transistor Q17 from being actuated to a substantially saturated condition, the transistor Q15 will be restored substantially instantaneously to a saturated condition and the transistor Q16 will be returned substantially instantaneously to a substantially nonconducting normal condition. Since however, the sum of the voltage drops across the capacitor C9 and the resistor R23 is equal to the voltage difference between the conductors P1 and N1, the voltage across the capacitor C9 following its discharge by the actuating of the transistor Q16 to a substantially saturated condition and the subsequent return of the transistor Q16 to a substantially nonconducting condition as just indicated will increase relatively slowly after the transistor Q16 is restored to a substantially nonconducting condition due to the presence of the resistor R23 in the charging path of the capacitor C9. The charging current which flows to the capacitor C9 from the conductor P1 after the transistor Q16 is returned to a substantially nonconducting condition will produce a gradually decreasing voltage drop across the resistor R23 which is sufficient to maintain the transistor Q17 in a substantially nonconducting condition for a predetermined time delay after the highest instantaneous current in one of the line conductors L1, L2 and L3 and the corresponding voltage across the resistor R1 decreases below the predetermined values necessary to actuate the level detecting circuit 260. In other words, if the highest instantaneous current flowing in the conductors L1, L2 and L3 should exceed a predetermined overcurrent value and then instantaneously decrease below the predetermined instantaneous value, the transistor Q17 will be prevented from being actuated to a substantially saturated operating condition and will be maintained in a substantially nonconducting condition by the timing circuit which includes the capacitor C9 and the resistor R23 which will delay the resetting of the level detecting circuit 260 for a predetermined time delay following the decrease of the highest instantaneous current below the predetermined value. The time delay may, for example, be slightly longer than the duration of one-half cycle of the alternating current which flows in the conductors L1, L2 and L3, as explained in greater detail in copending application Ser. No. 765,582, previously mentioned.

If the highest of the instantaneous currents which flow in the conductors L1, L2 and L3 should exceed the predetermined overload current to which the level detecting circuit 260 is adjusted to respond and then instantaneously decrease for a period of time less than the time delay for which the level detecting circuit 260 is adjusted, the transistor Q17 will be maintained in a substantially nonconducting condition and prevented from being actuated to a saturated condition by the output pulses of current from the the circuit means 270 but if the time interval between successive periods of instantaneous overcurrent should exceed the time delay period for which the level detecting circuit 260 is set, the transistor Q17 will be permitted to be actuated to a saturated condition by a portion of the output pulses of current from the circuit means 270 and rapidly reset the capacitor C8 by discharging the capacitor C8 through the circuit which includes the diode D35, the emitter-collector circuit of the transistor Q17 and the diode D33 to thereby reset the capacitor C8 so that the time delay provided by the overall long time delay tripping circuit 200 would have to again start from an initial operating point on the capacitor C8 assuming that the capacitor C8 is reset before the charge on the capacitor C8 and the voltage corresponding to the charge is sufficient to actuate the operation of the output circuit 500, as will be explained hereinafter.

In summary, the level detecting circuit 260 provides a relatively fast resetting time since the level detecting circuit 260 responds to the instantaneous value of the voltage across the resistor R1 and, in turn, to the highest instantaneous current flowing in the conductors L1, L2 and L3 and resets the timing capacitor C8 if the time interval between successive instantaneous periods of overcurrent above the predetermined value for which the level detecting circuit 260 is adjusted to respond is longer than the predetermined time period which may, for example, be slightly longer than one-half cycle of the alternating current flowing in said conductors for which the level detecting circuit 260 is set by the values of the timing circuit which includes the capacitor C9 and the resistor R23. It is to be noted that the predetermined overcurrent level to which the level detecting circuit 260 responds is normally relatively lower than the instantaneous overload current to which the short delay tripping circuit 300 responds and is normally relatively much lower than the instantaneous overload current to which the instantaneous tripping circuit 400 responds, as will be described hereinafter. It is also to be noted that when the transistor Q17 is in a substantially saturated condition, the diode D35 is forward biased and the output pulses of current from the circuit means 270 which flow from the collector of the transistor Q10 will flow to the conductor N1 through a current carrying path which extends from the collector of the transistor Q10 through the diode D28, the diode 35 and the emitter-collector circuit of the transistor Q17. Whenever the transistor Q17 is maintained in a substantially nonconducting condition and is prevented from being actuated to a saturated condition by the operation of the level detecting circuit 260, the voltage applied at the cathode of the diode D35 will be sufficient to reverse bias the diode D35 and permit the timing capacitor C8 to cumulatively charge from the output pulses of current from the circuit means 270 which flow from the collector of the transistor Q10 through the diode D28 to the upper side of the capacitor C8.

In order to limit the necessary size or value of the capacitor C8 to a practical value which is sufficient to provide the time delay required for different values of overload currents in the conductors L1, L2 and L3 which may, for example, be between 3 to 30 seconds, magnitude of the output pulses of current which are applied to the capacitor C8 by the circuit means 270 is limited to a certain range of current values. In addition, the total time duration of the periodic output pulses of current which are produced by the operation of the circuit means 270 during any predetermined time period is limited to a relatively small percentage of the total time during the predetermined time period, such as a duty cycle of 2 percent of the total time of any given time period. Under certain operating conditions, such as for relatively low overload currents, the periodic output pulses of current which are applied to the capacitor C8 by the circuit means 270 may not be sufficiently large to positively actuate the operation of the output circuit 500 as the voltage across the capacitor C8 approaches the predetermined value necessary to actuate the output circuit 500. In order to increase the sensitivity of the long time delay tripping circuit 200 and to insure that the output pulses of current applied from the long time delay tripping circuit 200 to actuate the output circuit 500 are sufficient for all operating conditions required in a particular application, the auxiliary pulse circuit 280 may be connected, where desired, to the circuit means 270 to periodically increase the voltage available at the upper side of the capacitor C8. More specifically, the auxiliary pulse circuit 280 is provided to periodically increase the voltage between the lower side of the capacitor C8 and the conductor N1.

The auxiliary pulse circuit 280 comprises the forward connected diodes D32 and D34 which are connected in series with one another between the lower side of the capacitor C8 and the conductor N1. In addition, the auxiliary pulse circuit 280 includes the resistor R52 which is connected between the junction point between the capacitor C8 and the diode D32 and the junction point between the diodes D26 and D27, as shown in FIG. 2A. It is also to be noted that the diode D33 is connected between the lower side of the timing capacitor C8 and the conductor N1 to complete the discharge path of the capacitor C8 during the actuation of the output circuit 500 by the long time delay tripping circuit 200 and to permit the reset of the timing capacitor C8 during certain operating conditions of the long time delay tripping circuit 200.

In the operation of the auxiliary pulse circuit 280, the transistor Q13 is normally maintained in a substantially saturated condition until the transistor Q14 breaks over to start one of the periodic output pulses which is produced by the circuit means 270 to thereby actuate the transistor Q13 to a substantially nonconducting condition. When the transistor Q13 is in a substantially nonconducting condition, a portion of the output current from the transistor Q10 flows from the collector of the transistor Q10 through the diode D26, the resistor R52, and the diodes D32 and D34 to the common conductor N1. During the output pulses of current produced by the circuit means 270, while the transistor Q13 is in a substantially nonconducting condition, the voltage at the lower side of the capacitor C8 with respect to the conductor N1 is raised by an amount equal to the forward voltage drops across the diodes D32 and D34.

In the overall operation of the long time delay tripping 200, as the charge on the capacitor C8 approaches the predetermined value necessary to forward bias the diode D31, the auxiliary pulse circuit 280 periodically increases the voltage at the lower side of the capacitor C8 with respect to the conductor N1 and effectively increases the voltage at the upper side of the capacitor C8 with respect to the conductor N1 and permits the output pulses of current from the circuit means 270 to be applied through the diode D31 when the total voltage effective at the upper side of the capacitor C8 reaches the predetermined value necessary to actuate the output circuit 500. The operation of the output circuit 500 may be thus assured over the entire range of overload currents to which the long time delay tripping circuit 200 responds.

In the overall operation of the long time delay tripping circuit 200, when the capacitor C8 is permitted to charge from the output pulses of current from the circuit means 270, the voltage across the capacitor C8 increases in discrete steps until the voltage at the upper side of the capacitor C8 is sufficiently positive to forward bias the diode D31. When the diode D31 is forward biased by the voltage at the upper side of the capacitor C8 increasing to a predetermined value, the output pulses of current from the circuit means 270 and the collector of the transistor Q10 are applied through the diodes D28 and D31 to the output circuit 500, as will be explained hereinafter, to actuate the operation of the output circuit 500 to thereby energize the trip coil 36 of the circuit breaker CB and to actuate the opening of said circuit breaker. Since the average charging current applied to the capacitor C8 from the circuit means 270 when the circuit means 270 is permitted to charge the capacitor C8 is substantially proportional to the square of the unidirectional voltage across the resistor R1 and, in turn, to the highest current flowing in the conductors L1, L2 and L3, the time delay period required to charge the capacitor C8 to substantially a predetermined value sufficient to actuate the output circuit 500 varies inversely with substantially the square of the highest line current which flows in the conductors L1, L2 and L3.

OUTPUT CIRCUIT 500

In general, the output circuit 500 of the protective device shown in FIG. 1 is connected to the long time delay tripping circuit 200 to respond to substantially a predetermined charge on the capacitor C8 which corresponds to a predetermined or a threshold voltage across said capacitor to actuate the energization of the trip coil 36 of the circuit breaker CB following a predetermined time delay which is initiated when the level detecting circuit 260 permits the timing capacitor C8 to start accumulating the necessary charge and which varies inversely with substantially the square of the highest current flowing in the line conductors L1, L2 and L3. More specifically, as shown in FIG. 2B, the output circuit 500 comprises the current amplifying transistors Q25 and Q26, the output level detecting circuit or trigger circuit 510 and the semiconductor switching device Q29 whose operation is actuated by the output level detecting circuit 510.

In general, the current amplifying transistor Q25 which is of the NPN type is connected to the timing capacitor C8 of the long time delay tripping circuit 200 to respond to a predetermined or a threshold voltage at the upper side of said timing capacitor which actuates the transistor Q25 from a normally substantially nonconducting or cut-off condition to a substantially saturated condition. More specifically, the base of the transistor Q25 is connected to the upper side of the timing capacitor C8 through a series circuit which includes the isolating diode D31 and the normally blocked or reverse biased diode D46. It is to be noted that where desired, a resistor R63 may be connected between the anode of the diode D46 and the common conductor N1 to establish the minimum current necessary to actuate the transistor Q25. The diode D31 is connected to the diode D46 through the terminal 420 which is indicated in FIGS. 2A and 2B. The emitter of the transistor Q25 is connected to the common conductor N1 through the resistors R53 and R54 which are connected in series with one another. In order to bias or maintain the transistor Q25 in the normally nonconducting or cut-off condition, the junction point between the emitter of the transistor Q25 and the resistor R53 is connected to the positive conductor P3 through the forward connected diode D45 and the terminal 418. If the regulated potential at the conductor P3 is 16 volts, for example, the voltage at the emitter of the transistor Q25 will be 16 volts less the forward voltage drop across the diode D45 or approximately 15.5 volts. The capacitor C23 is electrically connected in parallel with the series circuit which includes the resistors R53 and R54 to maintain the desired potential at the emitter of the transistor Q5 in cooperation with the diode D45 in the event that the regulated potentials at the conductors P1, P2 and P3 should collapse or be interrupted during the operation of the protective device shown in FIG. 1, while the timing capacitor C8 is partially charged which might cause an improper operation of the output circuit 500 and energize the trip coil 36 of the circuit breaker CB prematurely in an undesirable manner. The capacitor C22 is connected between the base and the emitter of the transistor Q25 to prevent noise or voltage spikes from inadvertently actuating the transistor Q25 to a substantially saturated condition other than in response to the operation of the long time delay tripping circuit 200, the short delay tripping circuit 300 or the instantaneous tripping circuit 400 or the ground current tripping circuit 600. The resistor R55 is connected between the base of the transistor Q25 and the junction point between the resistors R53 and R54 to assist in preventing the transistor Q25 from being actuated to a substantially saturated condition by the leakage current which might otherwise flow in the base-emitter circuit of the transistor Q25.

In the operation of the current amplifying transistor Q25, when the voltage at the upper side of the timing or integrating capacitor C8 increases to a predetermined or threshold value which may for example be for approximately 16.5 volts when the regulated potential at the conductor P3 is 16 volts, for example, the diodes D31 and D46 are both forward biased and a base drive current for the transistor Q25 flows from the upper side of the timing capacitor C8 through the diodes D31 and D46 and through the base-emitter circuit of the transistor Q25 to actuate the transistor Q25 from a substantially nonconducting or cut-off condition to a substantially saturated condition. When the transistor Q25 is actuated to a substantially saturated condition, saturation current will flow from the positive conductor P1 through the collector load resistor R52, which is connected between the positive conductor P1 and the collector of the transistor Q25, through the collector-emitter circuit of the transistor Q25 and to the common conductor N1 through the resistor R53 and R54.

In general, the second current amplifying transistor Q26 of the output circuit 500 is connected in circuit relation with the first current amplifying transistor Q25 to respond to the operation of the transistor Q25 to change from a substantially nonconducting condition to a substantially saturated condition whenever the transistor Q25 is actuated to a saturated condition in response to the voltage at the upper side of the timing capacitor C8 as just described. More specifically, the base of the transistor Q26 which is of the PNP type is connected at the junction point between the collector of the transistor Q25 and the collector load resistor R52. The emitter of the transistor Q26 is connected to the positive conductor P1 through a forward connected diode D50 which is provided to establish the minimum base drive current necessary to actuate the transistor Q26 to a substantially saturated condition. The capacitor C21 may be connected between the positive conductor P1 and the base of the transistor Q26 to prevent the inadvertent operation of the transistor Q26 due to noise or voltage spikes which may occur on the positive conductor P1. The collector of the transistor Q26 is connected to the common conductor N1 through a voltage dividing network which includes the collector load resistors R57 and R58. It is to be noted that the junction point between the resistor R57 and R58 is connected to the control means 150, previously described, by the conductor 534 through the terminal 424.

In the operation of the current amplifying transistor Q26, as long as the current amplifying transistor Q25 is in a normally nonconducting or cut-off condition, the current which flows in the collector-emitter circuit of the transistor Q25 through the resistor R52 is substantially negligible and the base of the transistor Q26 is maintained at a potential which is very close to the potential at the positive conductor P1 to thereby maintain the transistor Q26 in a substantially nonconducting or cut-off condition. As long as the transistor Q26 remains in its substantially nonconducting condition, the current flow in the emitter-collector circuit of the transistor Q26 is substantially negligible and the voltage drop across the resistor R58 will be relatively low to thereby result in a voltage at the upper end of the resistor R58 which is relatively close to the voltage at the common conductor N1.

In the operation of the current amplifying transistor Q26, when the transistor Q25 is actuated to a substantially saturated condition in response to the voltage at the upper side of the timing capacitor C8 increasing to the predetermined or threshold value previously mentioned, the current in the collector-emitter circuit of the transistor Q5 increases to the saturation current. The current which flows through the collector load resistor R52 and the increased voltage drop across the resistor R52 results in a base drive current being applied to the emitter-base circuit of the transistor Q26 which flows from the conductor P1 through the forward connected diode D50 and the emitter-base circuit of the transistor Q26 to actuate the transistor Q26 to a substantially saturated condition. When the transistor Q26 is actuated to substantially a saturated condition, the current flowing in the emitter-collector circuit of the transistor Q26 is limited only by the values of the resistors R57 and R58 and the voltage between the conductors P1 and N1. The increased current which flows in the emitter-collector circuit of the transistor Q26 results in an increased voltage drop across the resistor R58 and the voltage at the junction point between the resistors R57 and R58 increase to a level which may, for example, be approximately 8 volts with respect to the common conductor N1 after the capacitor C24 which is connected in parallel with the resistor R58 charges up to such a voltage.

In general, the output level detecting circuit 510 or the trigger circuit 510 is connected to the current amplifying transistor Q26 to respond to the predetermined or threshold voltage across the timing capacitor C8 as reflected by the operating condition of the transistor Q26. The output level detecting circuit 510 is of the breakover type in that once the operation of the output level detecting circuit is initiated, the operation of said circuit continues or proceeds by regenerative action until the operation of said circuit is completed. The output level detecting circuit 510 comprises the PNP transistor Q27 and the NPN transistor Q28. In general, the transistors Q27 and Q28 are connected in a circuit which is equivalent to that of a silicon controlled rectifier except that the transistor Q27 is connected in an inverted arrangement with the emitter and the collector interchanged compared with the usual equivalent circuit. More specifically, the collector of the transistor Q27 is connected to the junction point between the resistors R57 and R58, while the base of the transistor Q27 is directly connected to the collector of the transistor Q28. The emitter of the transistor Q27 is directly connected to the base of the transistor Q28, while the base of the transistor Q28 is connected to the common conductor N1 through the resistor R59 which prevents small amounts of leakage current from actuating the transistor Q28 to a saturated condition. The emitter of the transistor Q28 is connected to the gate electrode of the silicon controlled rectifier or semiconductor switching device Q29. In order to provide a certain degree of noise suppression in the operation of the output level detecting circuit 510, the emitter of the transistor Q28 is connected to the common conductor N1 through a parallel circuit which includes the resistor R60 and the capacitor C25.

In order to energize the trip coil 36 of the circuit breaker CB in response to the operation of the output level detecting circuit 510, the anode of the silicon controlled rectifier Q29 is connected to the positive conductor P1 through the resistor R56, while the cathode of the silicon controlled rectifier Q29 is connected to the common or negative conductor N1. The trip coil 36 is electrically connected in parallel with the resistor R56 at the terminals 512 and 514 between the positive conductor P1 which, in turn, is connected to one side of the supply capacitor C1 of the power supply input circuit 100 and the junction point between the resistor R56 and the anode of the silicon controlled rectifier Q29. More specifically, the trip coil 36 is connected between the terminal 512 as shown in FIG. 2B which, in turn, is connected to the positive conductor P1 and the terminal 514 which is connected, in turn, to the junction point between the resistor R56 and the anode of the silicon controlled rectifier Q29. In order to prevent an improper operation of the silicon controlled rectifier Q29 due to transient voltage surges which may occur during the overall operation of the protective device shown in FIG. 1, a noise suppression network, which includes the resistor R61 and the capacitor C26 connected in series, is connected between the anode and the cathode of the silicon controlled rectifier Q29 to bypass transient voltage surges around the silicon controlled rectifier Q29. In addition, the capacitor C27 may be connected between the anode of the silicon controlled rectifier Q29 and the common conductor N1 to provide an additional degree of noise suppression in the operation of the silicon controlled rectifier Q29.

In the overall operation of the output circuit 500, when the level detecting circuit 260 of the long time delay tripping circuit 200 permits the timing capacitor C8 to accumulate a charge from the circuit means 270, the voltage across the capacitor C8 increases in discrete intervals at an average rate which varies with substantially the square of the highest line current which flows in the conductors L1, L2 and L3, as previously, explained until the voltage across the timing capacitor C8 is sufficient to forward bias the diodes D31 and D46. When the diodes D31 and D46 are forward biased by the voltage at the upper side of the capacitor C8 which is periodically increased by the auxiliary pulse circuit 280, where provided, as previously explained, an input current for the output circuit 500 flows from the collector of the transistor Q10 of the circuit means 240, as controlled by the circuit means 270, through the diodes D31 and D46 and through the base-emitter circuit of the transistor Q25 to actuate the transistor Q25 from a nonconducting condition to substantially a saturated condition, to thereby increase the current which flows from the collector to the emitter of the transistor Q25. The increased current flow through the collector-emitter of the transistor Q25 results in an increased voltage drop across the resistor R52 which results in a base drive current which is applied to the emitter-base circuit of the transistor Q26 to also actuate the transistor Q26 from a nonconducting condition to substantially a saturated condition to thereby increase the current in the emitter-collector circuit of the transistor Q26. The increased current in the emitter-collector circuit of transistor Q26 results in an increased voltage across the resistor R52 as the capacitor C24 charges during the operation of the current amplifying transistor Q26. Prior to the increased voltage drop across the resistor R58, the voltage at the collector of the transistor Q27 of the output level detecting circuit 510 is insufficient to actuate the transistors Q27 and Q28 to substantially saturated conditions and the transistors Q27 and Q28 remain in substantially nonconducting conditions. When the voltage at the collector of the transistor Q27 increases to a predetermined value, such as 8 volts which is positive with respect to potential at the common conductor N1, the transistor Q27 first responds by an avalanche breakdown of the base-emitter junction of the transistor Q27. A base drive current then flows from the collector of the transistor Q27 into the base-emitter circuit of the transistor Q28 thus causing the collector-emitter circuit of the transistor Q28 to conduct slightly. The collector current of the transistor Q28 which is the base current of the transistor Q27 actuates the collector-emitter circuit of the transistor Q27 to conduct partially. When the transistor Q27 conducts partially, the base drive current of the transistor Q28 is increased to thereby cause a regenerative turn-on action of the transistors Q27 and Q28. When the transistors Q27 and Q28 are actuated to saturated conditions as just described, the voltage or charge across the capacitor C24 discharges through the transistors Q27 and Q28 into the gate electrode of the silicon controlled rectifier Q29 and flows to the anode of the controlled rectifier Q29 to thereby actuate the silicon controlled rectifier Q29 to a substantially conducting condition. When the silicon controlled rectifier Q29 is actuated to a substantially conducting condition, the trip coil 36 is energized by the current which flows from the positive conductor P1 through the trip coil 36 and the anode-cathode circuit of the controlled rectifier Q29 to the common conductor N1 to thereby actuate a tripping operation of the circuit breaker CB. It should be noted that the current which energizes the trip coil 36 flows from the right side of the energy storing capacitor C1 as shown in FIG. 2A through the positive conductor P1, the terminal 512, as shown in FIG. 1, the trip coil 36, the terminal 514, the anode-cathode circuit of the silicon controlled rectifier Q29 as shown in FIG. 2B to the common conductor N1 and then to the left side of the capacitor C1, as shown in FIG. 2A.

In the event that the capacitor C1 is not sufficiently charged to energize the trip coil 36, the control means 150, as previously described, will prevent the operation of the output circuit 500 by providing a relatively low resistance path from the upper end of the resistor R58 and the upper side of the capacitor C24 at the collector of the transistor Q27 through the conductor 534 and the collector-emitter circuit of the transistor Q4 which forms part of the control means 150 to the common or negative conductor N1 which will prevent the regenerative operation of the output level detecting circuit 500 of the output circuit 500.

It is to be noted that after the trip coil 36 is energized by the discharge of the capacitor C1 through said trip coil and the silicon controlled rectifier Q29, the resistor R56 which is connected in series with the anode-cathode circuit of the controlled rectifier Q29 provides a circulating path to dissipate the stored energy in the trip coil 36 which is normally in an inductive device after the contacts BC1, BC2 and BC3 are tripped open and the protective device shown in FIGS. 2A and 2B is deenergized, and thereby limits the inverse voltage applied to the controlled rectifier Q29 to a value within the rating of the controlled rectifier Q29.

In summary, the overall operation of the protective device shown in FIG. 1 due to the long time delay tripping circuit 200 is such that the tripping time in seconds of the associated circuit breaker CB varies inversely with substantially the square of the highest overcurrent in the line conductors L1, L2 and L3 over a predetermined range of overcurrents to which the long time delay tripping circuit 200 responds. The predetermined highest line current which actuates the start of the time delay provided in the operation of the long time delay tripping circuit 200 may be controlled between predetermined limits by the setting of the rheostat R16 which forms part of the level detecting circuit 260 of the long time delay tripping circuit 200. The minimum time delay characteristic provided by the time delay tripping circuit 200 may be obtained by the adjustment of the rheostat R62 which forms part of the emitter follower circuit 220 previously described or the maximum time delay characteristic provided by the long time delay tripping circuit 200 may be similarly obtained by the adjustment of the rheostat R62 with a family of intermediate time delay characteristics or curves being available by the adjustment of the rheostat R62 between the limiting positions or adjustments. In other words, the long time delay tripping circuit 200 provides substantially an $I^2t$ equal to $K$ (where $K$ equals a constant and $t$ equals tripping time) operating characteristic which may be varied in substantially a continuous manner between a minimum time delay characteristic and a maximum time delay characteristic by the adjustment of the rheostat R62 which in effect varies the constant $K$ to which $I^2t$ is substantially equal over a predetermined operating range of overload currents. As previously explained, if the highest line current flowing in the conductors L1, L2 and L3 exceeds the predetermined or threshold value to which the level detecting circuit 260 responds, as determined by the setting of the rheostat R16, the timing capacitor C8 will be permitted to start accumulating a charge from the circuit means 270. If, however, the highest line current flowing in the conductors L1, L2 and L3 then instantaneously decreases to a value less than the predetermined value to which the level detecting circuit 260 responds and remains less than the predetermined value, the timing capacitor C8 will be reset by the level detecting circuit 260 after a predetermined time interval or delay which depends upon the operation of the timing circuit which forms part of the level detecting circuit 260 and which may be adjusted or selected to be slightly longer than one-half cycle of the alternating current flowing in the conductors L1, L2 and L3 assuming that the last-mentioned time interval before the resetting of the capacitor C8 ends before the voltage across the capacitor C8 is sufficient to actuate the operation of the output level detecting circuit 510 of the output circuit 500. The reset of the timing capacitor C8 will be accomplished by restoring the control means 290 which comprises the transistor Q17 to an operating condition which permits the transistor Q17 to be actuated to substantially a saturated condition which rapidly discharges the timing capacitor C8 at the end of the time interval just mentioned.

SHORT DELAY TRIPPING CIRCUIT 300

Referring now to the short delay tripping circuit 300 which is indicated in block form in FIG. 1 and shown in detail in FIG. 2A, the short delay tripping circuit 300 is connected between the auctioneering circuit 110 and the output circuit 500 to respond to the highest instantaneous line current flowing in the conductors L1, L2 and L3 when the highest instantaneous line current exceeds substantially a predetermined or threshold value to actuate the output circuit 500 to energize the trip coil 36 following a substantially fixed or predetermined time delay which remains at the same predetermined value or duration independently of the magnitude of the highest instantaneous current in excess of the predetermined value to which the short delay tripping circuit 300 is adjusted to respond to start the time delay. The highest instantaneous current in the conductors L1, L2 and L3 to which the short delay tripping circuit 300 is adjusted to respond by the setting of the rheostat R25 may be any fault current within a predetermined range of fault currents which may for example, be one to seven or one to 10 times the continuous current rating of the circuit breaker CB which is reflected in the current ratings of the current transformers CT1, CT2 and CT3 and the ratios of the output currents of said current transformers to the currents in said line conductors, as previously mentioned in connection with the long time delay tripping circuit 200. It is to be noted that the short delay tripping circuit 300 independently actuates the output circuit 500 to energize the trip coil 36 with the predetermined current to which the short delay tripping circuit 300 responds being coordinated with te range of overload currents to which the long time delay tripping circuit 200 responds.

More specifically, the short delay tripping circuit 300 comprises a level detecting circuit 310 which includes the PNP transistors Q18 and Q19 and a voltage dividing network which controls the conducting state of a control means which comprises the diode D37 and which has a time delay reset operation of the same general type, as previously described in detail in connection with the level detecting circuit 260 of the long time delay tripping circuit 200. The voltage dividing network of the short delay tripping circuit 300 includes the rheostat R25 and the resistors R26 and R27 which are connected in series with one another between the variable voltage output conductor V1 and the positive conductor P3. The base of the transistor Q18 is connected to the junction point between the resistors R26 and R27, while the emitter of the transistor Q18 is connected to the conductor P1. The diode D36 is connected between the base and the emitter of the transistor Q18 to protect the emitter-base circuit of the transistor Q18 from excessive reverse bias by limiting the maximum reverse voltage applied to the emitter-base circuit of the transistor Q18 to the forward voltage drop of the diode D36. The input voltage of the short delay tripping circuit which is the sum of the voltage drops across the rheostat R25 and the resistor R26 is substantially equal to the unidirectional voltage across the resistor R1 and, in turn, is directly proportional to the highest instantaneous current flowing in the conductors L1, L2 and L3. The forward voltage drop in the emitter-base circuit of the transistor Q18 compensates the input voltage of the short delay tripping circuit 300 for the forward voltage drop across the diode D19 of the auctioneering circuit 110. The collector of the transistor Q18 is directly connected to the base of the transistor Q19 and also to the conductor N1 through the collector load resistor R28. The emitter of the transistor Q19 is connected to the conductor P1, while the collector of the transistor Q19 is connected to the conductor N1 through the collector load resistor R29 and through the diode D38 to the upper side of the timing capacitor C12 of the short delay tripping circuit 300. In order to delay the reset of the short delay tripping circuit 300 following the end of a period of time during which the highest instantaneous current flowing in the conductors L1, L2 and L3 exceeds the predetermined value to which the short delay tripping circuit 300 is adjusted to respond by the setting of the rheostat R25, the capacitor C11 is connected between the emitter and the collector of the transistor Q19 which is between the conductor P1 and the upper end of the resistor R29. In order to provide a substantially fixed or predetermined time delay between the start of an instantaneous overcurrent which exceeds the predetermined value to which the short delay tripping circuit is adjusted to respond, a resistor-capacitor timing circuit is provided as part of the short delay tripping circuit 300 which includes the rheostat R30, the resistor R31 and the timing capacitor C12 with the rheostat R30 and the resistor R31 being connected in series with one another between the conductor P1 (through the conductor 513) and the upper side of the timing capacitor C12. The upper side of the capacitor C12 is also connected to the base of the transistor Q25 which forms part of the output circuit 500 through the normally reverse biased diode D37. The lower side of the timing capacitor C12 is connected to the conductor N1. In the operation of the short delay tripping circuit 300, it is important to note that the output of the auctioneering circuit 110 at the conductor V1 which forms the input signal or voltage for the short delay tripping circuit 300 is unfiltered and therefore the input voltage of the short delay tripping circuit 300 which appears across the rheostat R16 and the resistor R17 varies substantially instantaneously with the highest line current flowing in the conductors L1, L2 and L3.

As long as the highest instantaneous current flowing in the conductors L1, L2 and L3 remains below substantially a predetermined value and the corresponding unidirectional voltage across the resistor R1 remains below a corresponding predetermined or threshold value, the transistor Q18 will be in a normally saturated condition since the emitter-base circuit of the transistor Q18 will be forward biased with the voltage at the conductor P1 being greater than the voltage at the base of the transistor Q18. As long as the transistor Q18 is in a normally saturated condition, the emitter-base circuit of the transistor Q19 will be biased at substantially zero voltage and the transistor Q19 will be maintained in a substantially nonconducting condition. As long as the transistor Q19 is in a substantially nonconducting condition, the voltage drop across the resistor R29 due to the emitter-collector current of the transistor Q19 will be relatively low and the voltage at the cathode of the diode D38 will be relatively close to that at the conductor N1 with the diode D38 being forward biased to prevent the timing capacitor C12 from accumulating a charge from the positive conductor P1 through the rheostat R30 and the resistor R31. Since the cathode of the diode D37 is normally maintained at a positive voltage with respect to the conductor N1, the diode D37 will normally be reverse biased or blocked since the voltage at the anode of the diode D37 will be equal to the sum of the forward voltage drop across the diode D38 and the relatively small voltage drop across the resistor R29 as long as the highest instantaneous current flowing in the conductors L1, L2 and L3 remains below the predetermined value to which the short delay tripping circuit 300 is adjusted to respond. It is to be noted that as long as the transistor Q19 is in a normally nonconducting condition, the capacitor C11 which is connected between the emitter and the collector of the transistor Q19 will be charged up to a voltage which is equal to the difference in voltage between the conductors P1 and N1 less a relatively low voltage drop across the resistor R29.

When the highest instantaneous current flowing in the conductors L1, L2 and L3 exceeds substantially a predetermined or threshold value to which the short delay tripping circuit 300 is adjusted to respond, the current which flow in the voltage dividing network which includes the rheostat R25, the resistor R26 and the resistor R27 will increase until the voltage at the base of the transistor Q18 increases in a positive direction to reverse bias the emitter-base circuit of the transistor Q18 which will then be actuated to a substantially nonconducting condition. When the transistor Q18 is actuated to a nonconducting condition, the current in the emitter-collector path of the transistor Q18 will decrease to a negligible value and the current which flows in the resistor R28 will now flow from the conductor P1 through the emitter-base circuit of the transistor Q19 which will then be actuated to a substantially saturated operating condition. When the transistor Q19 is actuated to a substantially saturated condition, the current in the emitter-collector path of the transistor Q19 increases to thereby cause an increased voltage drop across the resistor R29 which will then result in a voltage at the cathode of the diode D38 which is sufficient to reverse bias the diode D38 to permit the timing capacitor C12 to start accumulating a charge from the conductor P1 through the rheostat R30 and the resistor R31. Assuming that the overcurrent condition to which the short delay tripping circuit 300 is adjusted to respond continues for substantially a predetermined or fixed time delay which is determined by the setting of the rheostat R30, the resistor R31 and the capacitor C12 along with the value of the regulated potential at the conductor P1, the voltage at the upper side of the timing capacitor C12 will be sufficient to forward bias the diode D37. When the diode D37 is forward biased, current will flow from the conductor P1 through the rheostat R30 and the resistor R31 to cause a base drive current to flow through the diode D37 and the diode D46 into the base-emitter circuit of the transistor Q25 of the output circuit 500 to thereby cause the transistors Q25 and Q26 and the level detecting circuit 510 to actuate the controlled rectifier Q29 to a substantially conducting condition to thereby energize the trip coil 36 of the circuit breaker CB and to actuate the contacts of said circuit breaker to an open condition.

It is to be noted that when the transistor Q19 is actuated to a substantially saturated operating condition in response to the highest instantaneous current which flows in the conductors L1, L2 and L3, the capacitor C11 will rapidly discharge through the emitter-collector path of the transistor Q19. If the highest instantaneous current flowing in the conductors L1, L2 and L3 exceeds the predetermined value to which the short delay tripping circuit 300 is adjusted to respond by the setting of the rheostat R25 and then instantaneously decreases below the predetermined value, the transistor Q18 will be returned substantially instantaneously to a saturated condition and the transistor Q19 will be restored substantially instantaneously to a substantially nonconducting condition. The capacitor C11 will then start to charge from the voltage between the conductors P1 and N1 through the resistor R29. While the capacitor C11 is charging, the voltage across the resistor R29 will gradually decrease until the voltage at the cathode of the diode D38 decreases sufficiently to forward bias the diode D38 to thereby rapidly discharge the capacitor C12 if the overall time delay provided by the short time delay tripping circuit 300 has not been completed. In other words, after the operation of the short delay tripping circuit 300 has been actuated by the highest instantaneous current flowing in the conductors L1, L2 and L3 and then the highest instantaneous current decreases below the predetermined value necessary to actuate the short delay tripping circuit 300 for a predetermined time period which is determined by the values of the capacitor C11, the resistor R29 and the value of the voltage between the conductors P1 and N1, the resetting of the short time delay tripping circuit 300 will be delayed for a predetermined time interval which may be slightly longer than one-half cycle of the alternating current flowing in the conductors L1, L2 and L3 similarly to the operation of the level detecting circuit 260 of the long time delay tripping circuit 200 previously described. On the other hand, if the highest instantaneous current flowing in the conductors L1, L2 and L3 exceeds the substantially predetermined or threshold value to which the short delay tripping circuit 300 is adjusted to respond and then decreases for a period of time less than the time delay provided in the reset of the short delay tripping circuit 300, the timing out or accumulation of charge on the timing capacitor C12 will continue in an uninterrupted fashion. It is to be noted that the substantially predetermined or fixed time delay provided in the overall operation of the short delay tripping circuit 300 is independent of the magnitude of the highest instantaneous line current in the conductors L1, L2 and L3 for values of current in excess of the predetermined value to which the short delay tripping circuit 300 is adjusted to respond by the setting of the rheostat R25 and that the time delay provided may be adjusted between predetermined limits by the setting of the rheostat R30.

It is to be noted that the short delay tripping circuit 300 determines by the predetermined instantaneous current to which it is adjusted to respond the upper end of the range of overcurrents to which the long time delay tripping circuit 200 will respond in the particular application since if the highest instantaneous current flowing in the conductors L1, L2 and L3 exceeds the predetermined value to which the short delay tripping circuit 300 is adjusted to respond, the output circuit 500 will be independently actuated to energize the trip coil 36 after substantially a predetermined or fixed time delay which is normally shorter than the predetermined time delay provided in the operation of the long time delay tripping circuit 200. For example, the time delay provided by the short delay tripping circuit 300 may be between 2 to 10 cycles of the alternating current of a 60 cycle system or between 50 milliseconds and ½ second in typical applications. It is also to be noted that the reset of the short delay tripping circuit 300 is accomplished by the discharge of the capacitor C12 through the diode D38 and the resistor R29 to the conductor N1 rather than employing a control means of the emitter follower type such as the control means 290 which forms part of the level detecting circuit 260 of the long time delay tripping circuit 200, as previously described, since the timing capacitor C12 is normally of a lower value than the timing capacitor C8 which forms part of the long time delay tripping circuit 200. In the operation of the short delay tripping circuit 300, it is important to note also that the upper end of the rheostat R30 of the short delay tripping circuit 300 is connected to the regulated potential at the conductor P1 through the terminal 512 and the conductor 513 in order to insure that the duration of the substantially fixed or predetermined time delay provided by the short delay tripping circuit 300 remains at substantially the predetermined value or duration as determined by the setting of the rheostat R30.

Finally, it is to be noted that in the operation of the short delay tripping circuit 300, the isolating diode D31 assists in preventing the output current of the short delay tripping circuit from being diverted away from the base of the transistor Q25 in the output circuit 500.

INSTANTANEOUS TRIPPING CIRCUIT 400

Referring now to the instantaneous tripping circuit 400 indicated in block form in FIG. 1 and shown in detail in FIG. 2A, the instantaneous tripping circuit 400 in general is connected between the auctioneering circuit 110 of the power supply input circuit 100 and the output circuit 500 to actuate the energization of the trip coil 36 of the circuit breaker CB when the highest instantaneous line current flowing in the conductors L1, L2 and L3 increases above or exceeds substantially a predetermined or threshold value without any intentional time delay.

More specifically, the instantaneous tripping circuit 400 as shown in FIG. 2A comprises a PNP transistor Q20 and a voltage dividing network which includes the rheostat R32, the resistor R33 and the resistor R34 which are connected electrically in series with one another between the variable voltage output conductor V1 of the auctioneering circuit 110 and the positive conductor P3. The emitter of the transistor Q20 is connected to the junction point between the resistors R33 and R35, while the base of the transistor Q20 is connected to the positive conductor P2 in order that the forward voltage drop across the diodes D17 and D18 of the power supply input circuit 100 compensate the input voltage of the instantaneous tripping circuit 400 for the forward voltage drop across the diode D19 and for the forward voltage drop across the emitter-base circuit of the transistor Q20 during the operation of the instantaneous tripping circuit 400. The diode D39 is connected between the emitter and the base of the transistor Q20 in order to protect the emitter-base circuit of the transistor Q20 from excessive reverse bias by limiting the maximum reverse voltage applied to the emitter-base circuit of the transistor Q20 to the forward voltage drop of the diode D39. The collector of the transistor Q20 is connected to the common conductor N1 by the collector load resistor R34. The output of the instantaneous tripping circuit 400 at the collector of the transistor Q20 is connected to the base of the transistor Q25 of the output circuit 500 by the isolating diode D40 whose anode is connected to the collector of the transistor 20 and whose cathode is connected to the base of the transistor Q25 through the normally reverse biased diode D46 and the terminal 424 as shown in FIG. 2B. The capacitor C15 is connected electrically in parallel with the resistor R34 between the collector of the transistor Q20 and the common conductor N1 in order to provide a predetermined degree of noise suppression in the operation of the instantaneous tripping circuit 400 by diverting the output current of the instantaneous tripping circuit 400 to the common conductor N1 when such an output is due to transient voltage surges which may occur during the operation of the overall protective device shown in FIG. 1 and also to provide a pulse of discharge current to the output circuit 500 during the operation of the instantaneous tripping circuit 400 to insure that the transistors Q25 and Q26 of the output circuit 500 are both actuated to substantially saturated operating conditions and to insure that the silicon controlled rectifier Q29 is actuated to a substantially conducting condition to energize the trip coil 36 during the overall operation of the protective device shown in FIG. 1.

In the operation of the instantaneous tripping circuit 400, the base of the transistor Q20 is held at the regulated potential at the positive conductor P2. The voltage at the emitter of the transistor Q20 is substantially proportional to the unidirectional voltage across the resistor R1 and in turn, to the highest instantaneous line current flowing in the conductors L1, L2 and L3. More specifically, the voltage at the emitter of the transistor Q20 is equal to the voltage at the positive conductor P3 plus the voltage drop across the resistor R35 which depends in part on the setting of the rheostat R32. As long as the highest instantaneous line current flowing in the conductors L1, L2 and L3 remains below substantially a predetermined or threshold value, the emitter-base circuit of the transistor Q20 is reverse biased and the transistor Q20 is maintained in a substantially nonconducting condition. As long as the transistor Q20 is substantially nonconducting, the current flow to the resistor R34 from the emitter-collector circuit of the transistor Q20 is substantially negligible and the potential at the anode of the diode D40 is relatively close to the potential at the common conductor N1 with the diode D40 being normally reverse biased due to the potential which is applied to the cathode of the diode D40. When the highest instantaneous line current flowing in one of the conductors L1, L2 and L3 exceeds substantially a predetermined or threshold value to which the instantaneous tripping circuit is adjusted to respond by the setting of the rheostat R32, and the corresponding unidirectional or direct current voltage across the resistor R1 exceeds substantially a predetermined value, the voltage at the emitter of the transistor Q20 increases in a positive direction sufficiently to forward bias the emitter-base circuit of the transistor Q20 and to actuate the transistor Q20 to substantially a saturated condition. Due to the increased current flow in the emitter-collector circuit of the transistor Q20, the voltage drop across the resistor R34 increases to thereby forward bias the diode D40 and the output current of the instantaneous tripping circuit 400 flows from the collector of the transistor Q20 through the diode D40 and the diode D46 into the base-emitter circuit of the transistor Q25 of the output circuit 500 to actuate the output circuit 500 to, in turn, actuate the silicon controlled rectifier Q29 to a substantially conducting condition and to energize the trip coil 36, as previously explained in connection with the operation of the long time delay tripping circuit 200. As previously mentioned, when the highest instantaneous line current flowing in the conductors L1, L2 and L3 exceeds substantially a predetermined or threshold value for which the rheostat R32 is adjusted, the instantaneous tripping circuit 400 actuates the energization of the trip coil 36 in a substantially instantaneous manner without any intentional time delay. It is to be noted that in the operation of the instantaneous tripping circuit 400 as the highest instantaneous line current in the conductors L1, L2 and L3 exceeds the predetermined value to which the instantaneous tripping circuit 400 responds, the isolating diode D31 assists in preventing the output current of the instantaneous tripping circuit 400 from being diverted away from the transistor Q25 of the output circuit 500.

It is to be noted that the setting of the rheostat R32 of the instantaneous tripping circuit 400 determines at least in one respect the upper limit or end of the range of overload currents to which the long time delay tripping circuit 200 responds since when the highest instantaneous line current flowing in the conductors L1, L2 and L3 exceeds the predetermined value to which the instantaneous tripping circuit 400 responds, the trip coil 36 of the circuit breaker CB will be energized substantially instantaneously as determined by the operating characteristics of the instantaneous tripping circuit 400 without any intentional time delay being introduced prior to the energization of the trip coil 36. It is also important to note that the energization of the trip coil 36 in response to the long time delay tripping circuit 200 after a predetermined time delay which varies inversely with substantially the square of the overcurrent, in response to the short delay tripping circuit 300 after a substantially fixed or predetermined time delay or in response to the instantaneous tripping circuit 400 substantially instantaneously or in response to the ground current tripping circuit 600, as will be described hereinafter, occurs independently in response to each of said tripping circuits where provided.

GROUND CURRENT TRIPPING CIRCUIT 600

Referring now to the ground current tripping circuit 600 which is indicated in block form in FIG. 1 and which is shown in detail in FIGS. 2A and 2B, the ground current tripping circuit 600, in general, is connected between inputs which are obtained from the ground current transformer T4 and the auctioneering circuit 110 and the output circuit 500 to actuate the output circuit 500 to energize the trip coil 36 of the circuit breaker CB when the magnitude of the ground current, as sensed by the transformer T4, exceeds substantially a predetermined or threshold value during a first operating condition when the highest instantaneous line current in the conductors L1, L2 and L3 is below substantially a predetermined or threshold valve with substantially a predetermined time delay being provided between the time that the ground current exceeds the predetermined value and the time that the trip coil 36 of the circuit breaker CB is energized. During a second type of operating condition when the highest instantaneous line current flowing in the conductors L1, L2 and L3, as sensed by the auctioneering circuit 110, exceeds a predetermined or threshold value, the ground current tripping circuit 600 actuates the output circuit 500 to energize the trip coil 36 of the circuit breaker CB when the magnitude of the ground current in the protected system exceeds a value which varies with or depends upon the highest instantaneous line current in said conductors with substantially a predetermined time delay being provided between the time that the ground current exceeds the particular or appropriate value and the time that the trip coil 36 of the circuit breaker CB is energized.

As best shown in FIG. 1, the alternating output ground current of the ground current transformer T4 which is available at the terminals 142 and 144 at the opposite ends of the secondary winding of the transformer T4 is applied at the input terminals of a full wave bridge type rectifier circuit 80 which includes a plurality of diodes, as best shown in FIG. 2A, to obtain a unidirectional output current which is directly proportional to the actual ground current in the electrical system being protected which includes the line conductors L1, L2 and L3 and the neutral conductor N. The positive output terminal of the full wave bridge type rectifier 80 is connected to the positive conductor P1 through the conductor G10, the terminal 414 and the resistor R76, as best shown in FIG. 2B, to develop a unidirectional voltage or signal across the resistor R76 which is substantially proportional to the ground current in the electrical system being protected. The negative output terminal of the full wave bridge type rectifier 80 is connected to the common conductor N1 through the conductor G12. It is important to note that the resistor R76 is electrically connected in series with the energy storing capacitor C1 of the power supply input circuit 100 since the lower end of the resistor R76 is connected to the conductor P1 and to the right side of the energy storing capacitor C1 which is also connected to the conductor P1, as shown in FIG. 2A. The series circuit which includes the resistor R76 and the energy storing capacitor C1 is connected across the unidirectional output terminals of the full wave rectifier circuit 80 since the other side of the capacitor C1 is connected to the common or negative conductor N1, as shown in FIG. 2A. In other words, the ground current transformer T4 is connected as a substantially constant current source to provide an alternating output current which is rectified by the full wave rectifier circuit 80 and then applied to the resistor R76 to develop a unidirectional current voltage or signal to which the ground current tripping circuit 600 responds and to charge the energy storing capacitor C1 which is connected in series with the resistor R76. It is also important to note that the maximum unidirectional voltage to which the energy storing capacitor C1 can be charged from the transformer T4 through the full wave rectifier circuit 80 is limited by the operation of the shunt voltage regulator 140 which is connected electrically in parallel with the capacitor C1 between the conductor P1 and the common conductor N1, as previously described.

More specifically, the ground current tripping circuit 600 includes a level detecting circuit 610 which responds to the ground current input signal across the resistor R76 to provide an output when the ground current in the protected alternating current system exceeds a predetermined or threshold value as long as the highest instantaneous line current in the conductors L1, L2 and L3 remains below a predetermined or threshold value as sensed by the auctioneering circuit 110, a circuit means 630 which actuates the level detecting circuit 610 or modifies the operation of the level detecting circuit 610 to respond to a value of ground current in the protected system which varies with the highest instantaneous line current in said line conductors when the highest instantaneous line current exceeds the predetermined or threshold value just mentioned to produce said output and a time delay circuit 610 which provides a substantially predetermined or fixed time delay between the time that the level detecting circuit 610 produces said output in response to the value of the ground current in the protected system and the time that the trip coil 36 is energized by the operation of the output circuit 500 when actuated by the ground current tripping circuit 600 to trip the circuit breaker CB.

The level detecting circuit 610 of the ground current tripping circuit 600, as shown in FIG. 2B, includes a time delay reset arrangement similar to that of the level detecting circuit 260 of the long time delay tripping circuit 200 and to that the level detecting circuit 310 of the short delay tripping circuit 300 as previously described. In particular, the input of the level detecting circuit 610 comprises the voltage dividing network which includes the resistors R74 and R75 which are connected in series with one another between the positive output terminal of the full wave bridge type rectifier circuit 80 through the conductor G10 at the upper end of the resistor R76 and the positive conductor P3 through the diode D45. The level detecting circuit 610 also includes the PNP transistors Q30 and Q31. The base of the transistor Q30 is connected to the junction point between the resistors R74 and R75, while the emitter of the transistor Q30 is connected to the positive conductor P1. In order to protect the emitter-base circuit of the transistor Q30 from excessive reverse bias by limiting the reverse emitter-base voltage, the diode D63 is connected between the base and the emitter of the transistor Q30 to limit the voltage between the emitter and the base of the transistor Q30 to the forward voltage drop of the diode D63. The collector of the transistor Q30 is connected to the common conductor N1 through the collector load resistor R79 and also to the base of the transistor Q31. The emitter of the transistor Q31 is connected to the positive conductor P1, while the collector of the transistor Q31 is connected to the common conductor N1 through the collector load resistor R80. The collector of the transistor Q31 is also connected to the upper side of the timing capacitor C32 of the time delay circuit 620 through the normally forward biased diode D65. In order to delay the reset of the level detecting circuit 610 of the ground current tripping circuit 600 after the ground current in the protected system exceeds a value which is sufficient to actuate the level detecting circuit 610 to produce an output as will be explained in detail hereinafter, and then decreases below such a value before the time delay provided in the operation of the ground current tripping circuit 600 by the operation of the time delay circuit 620 is completed, the capacitor C31 is connected between the emitter and the collector of the transistor Q31.

As previously mentioned, the circuit means or second level detecting circuit 630 of the ground current tripping circuit 600 is connected, in general, between the current auctioneering circuit 110 of the power supply input circuit 100 and the level detecting circuit 610 of the ground current tripping circuit 600 for modifying the operation of the level detecting circuit 610 or for actuating the level detecting circuit 610 to respond to a value or level of ground current in the protected system which varies with the highest line current flowing in the conductors L1, L2 and L3, as reflected in the output of the auctioneering circuit 110 when the highest line current flowing in the conductors L1, L2 and L3 exceeds a predetermined or threshold value. More specifically, the input of the circuit means 630 which is of the emitter follower type comprises the Zener diode Z7, the voltage dividing network which includes the resistors R70 and R71, and the forward connected diodes D61 and D62 which are all connected in series with one another between the upper end of the resistor R1 of the auctioneering circuit 110 (through the diode D21 and the variable voltage output conductor V3) and the positive conductor P3 through the diode D45. The circuit means 630 also includes the NPN transistors Q32 and Q33. The base of the transistor Q32 is connected to the junction point between the resistors R70 and R71, while the emitter of the transistor Q32 is connected to the positive conductor P3 through the emitter load resistor R72 and the diode D45. The collector of the transistor Q32 is connected to the junction point between the resistors R74 and R75 of the level detecting circuit 610 along with the collector of the transistor Q33. The base of the transistor Q33 is connected to the junction point between the emitter of the transistor Q32 and the emitter load resistor R72, while the emitter of the transistor Q32 is connected to the conductor P3 through the emitter load resistor R73 and the diode D45. It is to be noted that during the operation of the circuit means 630, as will be explained in detail hereinafter, the forward voltage drops across the diodes D61 and D62 serve to compensate or add a voltage to the voltage across the resistor R71 which is substantially equal to the sum of the forward voltage drops across the base-emitter circuits of the current amplifying transistors Q32 and Q33. The diodes D61 and D62 also assist in temperature compensating the operation of the circuit means 630 for changes in the voltage drops across the base-emitter circuits of the transistors Q32 and Q33 due to changes in the environmental temperature.

The time delay circuit 620 of the ground current tripping circuit 600 comprises the rheostat R78 and the resistor R77 which are connected in series with one another between the positive conductor P1 (through the electrical conductor 515 and the terminal 512) and the upper side of the timing capacitor C32 which is connected in series with the rheostat R78 and the resistor R77 between the positive conductor P1 and the common conductor N1. The upper side of the timing capacitor C32 is also connected to the base of the transistor Q25 of the output circuit 500 through the normally reverse biased or blocked isolating diode D64 and the diode D46 and to the junction point between the collector of the transistor Q31 and the collector load resistor R80 through the normally forward biased diode D65.

In order to prevent the control means 290 which comprises the transistor Q17 of the long time delay tripping circuit 200 from forming a low resistance path between the cathode of the diode D64 and the common conductor N1 during the operation of the ground current tripping circuit 600 which would otherwise prevent the ground current tripping circuit 600 from actuating the operation of the output circuit 500, the collector of the transistor Q31 is connected to the base of the transistor Q17 which forms part of the level detecting circuit 260 of the long time delay tripping circuit 200 through the electrical conductor 621, the terminal 420 and the diode D67 whose cathode is connected to the junction point between the collector of the transistor Q26 and the base of the transistor Q17 which form part of the level detecting circuit 260 shown in FIG. 2A. The diode D31 whose cathode is connected to the terminal 424 of the output circuit 500 also assists in preventing the output current of the ground current tripping circuit 600 from being diverted away from the transistor Q25 of the output circuit 500.

In the operation of the ground current tripping circuit 600, it will be assumed initially that the ground current in the electrical system being protected is below substantially a minimum predetermined or threshold value, as sensed by the ground current transformer T4, and that the highest line current flowing in the conductors L1, L2 and L3 is below a predetermined or threshold value as sensed by the current auctioneering circuit 110 and as established by the operation of the circuit means 630, as will be explained in detail hereinafter. During such an assumed operating condition, the emitter-base circuit of the transistor Q30 will be forward biased since the voltage at the emitter of the transistor Q30 which is the same as the regulated potential at the positive conductor P1 will be greater than the voltage at the base of the transistor Q30 which is equal to the voltage at the positive conductor P3 less the forward voltage drop across the diode D45 and plus the voltage drop across the resistor R75. As long as the transistor Q30 is in a substantially saturated operating condition due to the forward biasing of its emitter-base circuit, the emitter-collector current of the transistor Q30 will produce a voltage drop across the resistor R79 which results in a substantially zero voltage bias of the base-emitter junction or circuit of the transistor Q31 and the transistor Q31 will be maintained in a normally substantially cut-off or nonconducting condition. As long as the transistor Q31 is substantially nonconducting, the voltage drop across the resistor R80 will be substantially negligible or at a relatively low value and the diode D65 will be forward biased due to the voltage at the positive conductor P1 which is applied to the anode of the diode D65 through the rheostat R78 and the resistor R77. As long as the diode D65, which comprises a control means whose conduction is controlled by the operation of the ground current tripping circuit 600, is forward biased and in a substantially conducting condition, the timing capacitor C32 will not be permitted to accumulate a charge from the positive conductor P1 through the resistor R77 since the current flow from the conductor P1 through the rheostat R78 and the resistor R77 will be diverted away from the capacitor C32 to the common conductor N1 through the diode D65 and the resistor R80. It is to be noted that as long as the transistor Q31 remains in a substantially nonconducting condition, the capacitor C31 will charge up to a voltage which is equal to the voltage difference between the conductors P1 and N1 less the relatively low voltage drop across the resistor R80. It is also to be noted that as long as the diode D65 remains forward biased, the voltage at the upper side of the capacitor C32 will be equal to the sum of the forward voltage drop of the diode D65 and the voltage drop across the resistor R80 which is relatively low so that the diode D64 will be reverse biased or blocked due to the potential which is applied at the cathode of the diode D64.

In the operation of the ground current tripping circuit 600, assuming that the highest line current remains below the predetermined or threshold value to which the circuit means 630 responds to modify the response of the level detecting circuit 610 as will be explained hereinafter, when the ground current in the electrical system being protected exceeds substantially a minimum predetermined or threshold value to which the level detecting circuit 610 is set to respond and the corresponding unidirectional voltage across the resistor R76 exceeds substantially a corresponding predetermined or threshold value, the voltage at the base of the transistor Q30 will increase sufficiently in a positive direction to reverse bias the emitter-base circuit of the transistor Q30 which will then be actuated from a substantially saturated operating condition to a substantially nonconducting condition. When the transistor Q30 is actuated to a substantially nonconducting condition, the current in the emitter-collector circuit of the transistor Q30 will decrease to a negligible value and the current which flows in the resistor R79 will be diverted away from the transistor Q30 and will flow from the positive conductor P1 through the emitter-base circuit of the transistor Q31. The transistor Q31 will then be actuated from a substantially nonconducting condition to a substantially saturated operating condition. When the transistor Q31 is actuated to a substantially saturated operating condition, the emitter-collector current of the transistor Q31 will increase to thereby increase the voltage drop across the resistor R80 and to reverse bias or block the diode D65 which will then permit the timing capacitor C32 to start accumulating a charge from the positive conductor P1 through the rheostat R78 and the resistor R77. If permitted to do so by the continuing of the ground current to exceed the minimum predetermined or threshold value, the voltage across the timing capacitor C32 will gradually increase after a predetermined time delay to a value which is sufficient to forward bias the diode D64. It is to be noted that since the timing capacitor C32 is charged from the regulated potential at the conductor P1 through the rheostat R78 and the resistor R77, the time delay provided by the time delay circuit 620 will be substantially a predetermined or fixed value after the charging of the capacitor C32 is started by the operation of the level detecting circuit 610, as just described, and will be independent of the degree to which the ground current exceeds the minimum predetermined or threshold value to which the ground current tripping circuit 600 responds during the assumed operating condition. When the diode D64 is forward biased by the voltage across the timing capacitor C32, a current will flow from the positive conductor P1 through the rheostat R78, the resistor R77 and the diode D64 to the base of the transistor Q25 of the output circuit 500 through the diode D46 which forms part of the output circuit 500 which will then be actuated to energize the trip coil 36 of the circuit breaker CB from the energy storing capacitor C1 and to actuate said circuit breaker to an open condition as previously described in detail in connection with the long time delay tripping circuit 200. It is to be noted that during the assumed operating condition as just described, the level detecting circuit 610 produces a first output which may be considered to be the increased voltage drop across the resistor R80 which permits the timing capacitor C32 to start accumulating a charge and then the time delay circuit 620 produces a second output of the ground current tripping circuit 600 which is the output current which flows through the diode D64 after a predetermined or fixed time delay which is initiated when the level detecting circuit 610 produces the first output just mentioned.

During the assumed operating condition, if the ground current in the protected system exceeds a predetermined or threshold value necessary to actuate the transistor Q31 to a substantially saturated operating condition as just described, the capacitor C31 which is connected between the emitter and the collector of the transistor Q31 will be rapidly discharged through the emitter-collector path of the transistor Q31. If the ground current during the assumed operating condition exceeds the predetermined or threshold value necessary to actuate the transistor Q31 to substantially a saturated condition and then instantaneously decreases below the predetermined or threshold value, the capacitor C31 will gradually charge through the resistor R80 until the voltage at the cathode of the diode D65 decreases due to the decreasing voltage drop across the resistor R80 sufficiently to forward bias the diode D65 to thereby rapidly discharge or reset the timing capacitor C32 if the voltage across the capacitor C32 has not yet increased to the value necessary to forward bias the diode D64. The time delay in the resetting of the ground current tripping circuit 600 following the end of a ground current which exceeds the value to which the level detecting circuit 610 responds during a particular operating condition to thereby actuate the operation of the level detecting circuit 610 is for a time period which might be slightly longer than one-half cycle of the alternating current which flows in the conductors L1, L2 and L3 and is determined by the values of the capacitor C31 and the resistor R80 and the voltage between the conductors P1 and N1. In other words, if the value of the ground current in the circuit being protected exceeds the value to which the level detecting circuit 610 responds during a particular operating condition and then continues without an interruption longer than the resetting time delay of the level detecting circuit 610, the charging of the capacitor C32 will continue in an uninterrupted manner until the fixed time delay provided by the time delay circuit 620 of the ground current tripping circuit 600 is completed. It is to be noted that the predetermined time delay provided by the time delay circuit 620 of the ground current tripping circuit 600 may be varied between minimum and maximum values by the adjustment or setting of the rheostat R78 which forms part of the time delay circuit 620.

During the assumed operating condition, it was assumed that the highest line current flowing in the conductors L1, L2 and L3 was below a predetermined or threshold value to which the circuit means 630 responds as reflected in the output of the current auctioneering circuit 110. During the assumed operating condition, the voltage at the base of the transistor Q32 of the circuit means 630 with respect to the voltage at the emitter of the transistor Q33 is insufficient to apply a base drive current to the base-emitter circuits of the transistors Q32 and Q33, the transistors Q32 and Q33 will be maintained in substantially nonconducting conditions. As long as the transistors Q32 and Q33 remain in substantially nonconducting conditions, the current flow from the conductor G10 through the resistor R74 at the input of the level detecting circuit 610 and into the collector-emitter circuits of the transistors Q32 and Q33 will be substantially negligible and the circuit means 630 will have substantially no effect on the operation or response of the level detecting circuit 610 of the ground current tripping circuit 600. In other words, during the assumed operating condition substantially none of the output current from the ground current transformer T4 which is applied to the input of the level detecting circuit 610 through the bridge rectifier circuit 80 will be diverted away from the resistor R75 of the level detecting circuit 610 by the circuit means 630, and the operation of the level detecting circuit 610 will be, as just described, to respond to a substantially predetermined or threshold value of the ground current in the protected system, as sensed by the ground current transformer T4.

When the highest line current flowing in the conductors L1, L2 and L3 exceeds substantially a predetermined or threshold value to which the circuit means 630 responds, the voltage at the conductor V3 which is connected to the output of the auctioneering circuit 110 will increase to a value which is sufficient to substantially avalanche or break down the Zener diode Z7 and the voltage across the resistor R71 will increase. When the voltage across the resistor R71 increases, a base drive current will be applied to the base-emitter circuits of the transistors Q32 and Q33 which will be amplified in the corresponding collector-emitter circuits of the transistors Q32 and Q33 causing the voltage across the resistor R73 to follow the voltage across the resistor R71 and to increase until the voltage across the resistor R73 is substantially equal to the voltage across the resistor R71. The increased currents which will flow in the collector-emitter circuits of the transistors Q32 and Q33 will flow from the conductor G10 through the resistor R74 and thus divert a portion of the current which would otherwise flow to the resistor R75 of the level detecting circuit 610 away from the resistor R75 to effectively decrease the ground current signal to which the level detecting circuit 610 responds. As the highest line current flowing in the conductors L1, L2 and L3 increases, the amount of current which is diverted away from the resistor R75 also increases. In other words, when the highest line current flowing in the conductors L1, L2 and L3 exceeds the predetermined or threshold value to which the circuit means 630 responds and increases above the predetermined or threshold value, the value of ground current which flows in the protected system which is necessary to actuate the transistor Q30 from a substantially saturated condition to a substantially nonconducting condition increases or varies with the highest line current in the conductors L1, L2 and L3. In effect, the value of ground current which is necessary to actuate the level detecting circuit 610 after the highest line current exceeds the predetermined or threshold value to which the circuit means 630 responds must be greater than the minimum predetermined or threshold value which is necessary to actuate the level detecting circuit 610 as long as the highest line current in the conductors L1, L2 and L3 remains below the predetermined or threshold value necessary to actuate the circuit means 630 as just described. In other words, the value of ground current which is necessary to actuate the level detecting circuit 610 to produce the output across the resistor R79, previously mentioned, after the highest line current in the conductors L1, L2 and L3 exceeds the predetermined or threshold value to which the circuit means 630 responds, must be sufficient to increase the current through the resistor R74 sufficiently to offset the current which is diverted away from the resistor R75 by the operation of the circuit means 630.

Assuming that the value of the ground current is sufficient after the highest line current in the conductors L1, L2 and L3 has exceeded the predetermined or threshold value to which the circuit means 630 responds to actuate the level detecting circuit 610, the operation of the level detecting circuit 610 and the time delay circuit 620 is the same as previously described for the operating condition when the highest line current was below the predetermined or threshold value to which the circuit means 630 responds and the ground current exceeds the minimum predetermined or threshold value which actuates the transistor Q30 of the level detecting circuit 610 from a substantially saturated condition to a substantially non-conducting condition and the transistor Q31 is actuated from a substantially nonconducting condition to a substantially saturated condition to thereby reverse bias the diode D65 and permit the start of the time delay provided by the time delay circuit 620.

It is to be noted that during the operation of the ground current tripping circuit 600 for the different operating conditions just described, each time that the transistor Q31 is actuated from a substantially nonconducting condition to substantially a saturated operating condition in response to a particular value of ground current flowing in the electrical system being protected for the different operating conditions considered, the voltage drop across the resistor R80 which increases with increased current flow in the emitter-collector circuit of the transistor Q31 results in a higher positive voltage at the cathode of the diode D65 which is transmitted to the base of the transistor Q17 through the conductor 621 and the diode D67 which reverse biases the emitter-base circuit of the transistor Q17 and insures that the transistor Q17 is actuated to a substantially nonconducting condition. This operation prevents the control means 290 which comprises the transistor Q17 from forming a low resistance path to the common conductor N1 which might otherwise divert the output current from the ground current tripping circuit 600 away from the transistor Q25 of the output circuit 500 and prevent the ground current tripping circuit 600 from actuating the operation of the output circuit 500. This circuit arrangement is desirable since the level detecting circuit 260 of the long time delay tripping circuit 200 may not actuate the control means 270 which comprises the transistor Q17 to a substantially nonconducting condition even though the ground current in the electrical system which includes the conductors L1, L2 and L3 may have reached a predetermined ground current which is sufficient to actaute the operation of the ground current tripping circuit 600. In addition, the diode D31 assists in preventing the output current of the ground current tripping circuit 600 from being diverted away from the transistor Q25 of the output circuit 500, as previously mentioned.

It is important to note that the ground current tripping circuit 600 as just described may be employed or applied independently of the long time delay tripping circuit 200, the instantaneous tripping circuit 300 and the short delay tripping circuit 400 where desired. In such a modified arrangement, the long time delay tripping circuit 200, the short delay tripping circuit 300 and the instantaneous tripping circuit 400 would all be omitted. In addition, the transformers T1, T2 and T3 and the associated rectifier circuits 50, 60 and 70 which form part of the power supply input circuit 100 would also be omitted in such a modified arrangement in which ground fault protection only is provided. In such a modified arrangement, the diode D67 which also forms part of the ground current tripping circuit 600 would also be unnecessary.

In summary, where only ground fault protection is required in a particular application, the required equipment would include means for obtaining an output current which varies with the ground current in the associated polyphase system, such as the wye connected current transformers CT1, CT2 and CT3 whose neutral terminal at NT1 would be connected to one side of the primary winding of the transformer T4 and whose output terminals 52, 62 and 72 would all be connected to the other side of the primary winding of the transformer T4. In addition, if the alternating current system is of the three-phase four wire type as shown in FIG. 1, an additional current transformer such as the current transformer CT4 would be required as shown in FIG. 1 with the output of the additional current transformer applied to the primary winding of the ground current transformer T4. Alternately, a conventional window type current transformer could be provided instead of the wye connected current transformers CT1, CT2 and CT3 with the output of such a window type current transformer being connected to the primary winding of the transformer T4. The additional current transformers such as the current transformer CT4 would also be required with such a window type current transformer with a four-wire system. In addition, the rheostat R78, all the components of the ground current tripping circuit 600 except the diode D67, the energy storing capacitor C1, the shunt voltage regulator 140, the control circuit 150 and the output circuit 500 would be required. It is important to note that in such a modified arrangement, the output current from the ground current transformer T4 would provide the current to develop the necessary voltage across the resistor R76 and also to charge the energy storing capacitor C1 to provide the necessary energy or power required for the operation of the ground current tripping circuit 600 which would in turn actuate the output circuit 500 to energize the trip coil 36 of the circuit breaker CB when the ground current in the protected system exceeded either a predetermined or threshold value when the highest line current was below the predetermined or threshold value, previously described, or exceeded a value which varied with the highest line current when the highest line current exceeded the predetermined or threshold value to which the circuit means 630 responds. It is to be noted that in a three-phase, four wire alternating current system, as shown in FIG. 1, the output current of the additional current transformer, such as the current transformer CT4, which is required is arranged to be vectorially subtracted from the output current of the wye connected current transformers or window type current transformer where provided. The net difference between such output currents varies with the actual ground current in such a system and is applied to the primary winding of the ground current transformer T4 as previously described. In a three-phase three wire system, the additional current transformer such as the current transformer CT4 is not required and would be omitted in a protective device as disclosed.

The circuits and apparatus embodying the teachings of this invention have several advantages. For example, a protective device including a ground current tripping circuit, as disclosed, responds to a predetermined value or level of ground current as long as the highest line current in the associated electrical system remains below a predetermined or threshold value, and responds to a value of ground current which varies with or increases with the highest line current when the highest line current in the protective system exceeds a predetermined or threshold value to overcome the problems associated with obtaining a significant or accurate ground current signal for relatively high values of line currents in an alternating current system due to the problems of appropriate current transformers which are necessary and whose operations may be affected by associated, closely spaced current transformers in the different phases of such an alternating current system. It has been found that a protective device including a ground current tripping circuit, as disclosed, avoids certain undesirable tripping operations of a circuit breaker which is intended for and adapted to the protection of alternating current systems which carry relatively high values of line currents such as 1,000 amperes and higher. Undesirable or improper tripping operations of a circuit breaker including a protective device having an improved ground current tripping circuit as disclosed are thus avoided.

We claim as our invention:

1. A circuit breaker for the protection of an alternating current system having at least two line conductors comprising at least one set of separable contacts adapted to be connected to said line conductors, operating means for opening and closing said contacts, first means for obtaining an alternating output current which varies with the ground current in said system, rectifying means having input terminals connected to said first means and output terminals for providing a first unidirectional current output signal which varies with the ground current in said system, second means for deriving a second unidirectional current output signal which varies with the highest current in said line conductors, a level detecting circuit connected to said first and second means to be responsive to said first and second output signals for producing an output which actuates said operating means to open said contacts when said first output signal exceeds a first predetermined value and when said second output signal is less than a second predetermined value, and third means connected between said second means and said level detecting circuit to be responsive to said second output signal for actuating said level detecting circuit to produce the above-mentioned output when said second output signal exceeds said second predetermined value and when said first output signal exceeds a value which is greater than said first predetermined value and which increases with said second output signal.

2. The combination as claimed in claim 1 wherein said system includes three line conductors and said circuit breaker includes three sets of separable contacts which are connected to the respective line conductors.

3. The combination as claimed in claim 1 wherein an additional means is connected in circuit relation with said level detecting circuit and said operating means to be responsive to the output of said level detecting circuit for producing an additional output which actuates said operating means to open said contacts after a predetermined time delay which is initiated upon the occurrence of the output of said level detecting circuit.

4. The combination as claimed in claim 1 wherein a resistor and an energy storing capacitor is connected in series circuit relationship with one another, the series circuit being connected across the output terminals of said rectifying means to develop said first unidirectional current output signal across said resistor which varies with the ground current in said alternating current system and said level detecting circuit is connected to said resistor to be responsive to said first unidirectional current output signal.

5. The combination as claimed in claim 2 wherein a resistor and an energy storing capacitor is connected in series circuit relationship with one another, the series circuit being connected across the output terminals of said rectifying means to develop said first unidirectional current output signal across said resistor which varies with the ground current in said alternating current system and said level detecting circuit is connected to said resistor to be responsive to said first unidirectional current output signal.

6. The combination as claimed in claim 3 wherein a resistor and an energy storing capacitor is connected in series circuit relationship with one another, the series circuit being connected across the output terminals of said rectifying means to develop said first unidirectional output signal across said resistor which varies with the ground current in said alternating current system and said level detecting circuit is connected to said resistor to be responsive to said first unidirectional current output signal.

7. A protective relay device for use with an alternating current system having at least two line conductors comprising first means for obtaining an alternating output current which varies with the ground current in said system, rectifying means having input terminals connected to said first means and output terminals for providing a first unidirectional current output signal which varies with the ground current in said system, second means for deriving from said system a second unidirectional current output signal which varies with the current in at least one of said line conductors, a level detecting circuit connected to said first and second means to be responsive to said first and second output signals for producing an output when said first output signal exceeds a first predetermined value and when said second output signal is less than a second predetermined value, and third means connected between said second means and said level detecting circuit to be responsive to said second output signal for actuating said level detecting circuit to produce the above-mentioned output when said second output signal exceeds said second predetermined value and when said first output signal exceeds a value which is greater than said first predetermined value and which increases with said second output signal.

8. The combination as claimed in claim 7 wherein said alternating current system is of the three-phase type and includes three line conductors, and an additional means is connected between said second means and said level detecting circuit for deriving a unidirectional output signal which varies with only the highest of the currents in said three line conductors, and said level detecting circuit responds to the last-mentioned output signal and to said second unidirectional output signal.

9. The combination as claimed in claim 7 wherein an additional means is connected in circuit relation with said level detecting circuit to be responsive to the output of said level detecting circuit for producing an additional output after a predetermined time delay which is initiated upon the occurrence of the output of said level detecting circuit.

10. The combination as claimed in claim 7 wherein a resistor and an energy storing capacitor is connected in series circuit relationship with one another, the series circuit being connected across the output terminals of said rectifying means to develop said first unidirectional output signal across said resistor which varies with the ground current in said alternating current system and said level detecting circuit is connected to said resistor to be responsive to said first unidirectional current output signal.

11. The combination as claimed in claim 8 wherein a resistor and an energy storing capacitor is connected in series circuit relationship with one another, the series circuit being connected across the output terminals of said rectifying means to develop said first unidirectional output signal across said resistor which varies with the ground current in said alternating current system and said level detecting circuit is connected to said resistor to be responsive to said first unidirectional current output signal.

12. The combination as claimed in claim 9 wherein a resistor and an energy storing capacitor is connected in series circuit relationship with one another, the series circuit being connected across the output terminals of said rectifying means to develop said first unidirectional output signal across said resistor which varies with the ground current in said alternating current system and said level detecting circuit is connected to said resistor to be responsive to said first unidirectional current output signal.

* * * * *